United States Patent
Rollins

(10) Patent No.: US 9,690,807 B2
(45) Date of Patent: Jun. 27, 2017

(54) MOBILE-ENABLED SYSTEMS AND PROCESSES FOR INTELLIGENT RESEARCH PLATFORM

(71) Applicant: Thomson ReuterS Global Resources, Baar (CH)

(72) Inventor: Jason E. Rollins, San Francisco, CA (US)

(73) Assignee: Thomson Reuter's Global Resources (TRGR), Baar (CH)

( * ) Notice: Subject to any disclaimer, the term of this patent is extended or adjusted under 35 U.S.C. 154(b) by 70 days.

(21) Appl. No.: 14/132,696

(22) Filed: Dec. 18, 2013

(65) Prior Publication Data

US 2014/0172832 A1 Jun. 19, 2014

Related U.S. Application Data

(60) Provisional application No. 61/738,725, filed on Dec. 18, 2012, provisional application No. 61/789,663, filed on Mar. 15, 2013.

(51) Int. Cl.
*G06F 17/30* (2006.01)

(52) U.S. Cl.
CPC .. *G06F 17/30253* (2013.01); *G06F 17/30047* (2013.01)

(58) Field of Classification Search
CPC ............ G06F 17/30253; G06F 17/30047
USPC .......................................... 707/722
See application file for complete search history.

(56) References Cited

U.S. PATENT DOCUMENTS

| 5,506,697 A | * | 4/1996 | Li | G06F 3/002 235/462.09 |
| 5,664,109 A | * | 9/1997 | Johnson | G06F 19/322 705/2 |
| 5,692,073 A | * | 11/1997 | Cass | G06F 17/243 358/468 |

(Continued)

FOREIGN PATENT DOCUMENTS

| CN | 1664829 A | 9/2005 |
| CN | 101765840 A | 6/2010 |
| WO | 2007021996 A2 | 2/2007 |

OTHER PUBLICATIONS

Lopez, Patricia, "Automatic Extraction and Resolution of Bibliographical References in Patent Documents", IRFC 2010, LNCS 6107, Springer-Verlag, Berlin, Germany, © 2010, pp. 120-135.*

(Continued)

*Primary Examiner* — Robert Stevens
(74) *Attorney, Agent, or Firm* — McCarter & English, LLP; Sean R. MacDavitt

(57) ABSTRACT

Exemplary embodiments of the present disclosure are directed to implementing image-based retrieval of a cited reference in a written work. A unique alphanumeric identifier extracted from an image taken of a portion of a written work can be programmatically compared to stored identifiers in an authority database in response to a request received from a portable computing device. Cited reference data can be retrieved from the authority database in response to a favorably comparison of the unique alphanumeric identifier to at least one of the stored identifiers associated with a reference stored in the authority database and the cited reference data can be provided to the portable computing device for output on the display of the portable computing device.

19 Claims, 17 Drawing Sheets

(56) References Cited

U.S. PATENT DOCUMENTS

| | | | | |
|---|---|---|---|---|
| 5,974,202 A * | 10/1999 | Wang | G06F 3/002 358/442 |
| 6,205,428 B1 * | 3/2001 | Brown | G10L 17/14 455/563 |
| 6,360,951 B1 * | 3/2002 | Swinehart | G06K 9/00469 235/462.07 |
| 6,738,780 B2 * | 5/2004 | Lawrence | G06F 17/30728 707/722 |
| 6,917,724 B2 * | 7/2005 | Seder | G06Q 30/02 358/403 |
| 8,014,039 B2 * | 9/2011 | Nohtomi | H04N 1/00244 358/1.15 |
| 8,037,018 B2 * | 10/2011 | Waldo | G06F 17/2725 707/609 |
| 8,156,128 B2 | 4/2012 | Ramer et al. | |
| 8,332,401 B2 | 12/2012 | Hull et al. | |
| 2001/0053252 A1 * | 12/2001 | Creque | G06F 17/30011 382/305 |
| 2005/0149538 A1 * | 7/2005 | Singh | G06F 17/30893 |
| 2007/0172062 A1 * | 7/2007 | Waldo | G06F 17/2725 380/252 |
| 2007/0226321 A1 * | 9/2007 | Bengtson | H04N 1/00244 709/219 |
| 2007/0255734 A1 * | 11/2007 | Morimoto | H04N 1/00222 |
| 2007/0266087 A1 * | 11/2007 | Hamynen | G06F 17/30887 709/203 |
| 2008/0028223 A1 | 1/2008 | Rhoads | |
| 2008/0056572 A1 * | 3/2008 | Nielsen | G06K 9/6224 382/173 |
| 2008/0097984 A1 * | 4/2008 | Candelore | G06F 17/30253 |
| 2008/0151302 A1 * | 6/2008 | Lee | B42C 1/00 358/1.16 |
| 2008/0313172 A1 | 12/2008 | King et al. | |
| 2008/0320579 A1 * | 12/2008 | Rollins | G06F 17/24 726/10 |
| 2009/0144614 A1 * | 6/2009 | Dresevic | G06F 17/2205 715/239 |
| 2011/0072395 A1 * | 3/2011 | King | G06F 17/241 715/825 |
| 2012/0072422 A1 * | 3/2012 | Rollins | G06F 17/2745 707/737 |
| 2013/0067368 A1 * | 3/2013 | Mihara | G06Q 10/103 715/764 |

OTHER PUBLICATIONS

Belaïd, A., et al., "Chap. 15: Meta-Data Extraction from Bibliographic Documents for the Digital Library", Digital Document Processing, London, UK, © 2007, pp. 329-350.*

Takasu, Atsuhiro, "Bibliographic Attribute Extraction from Erroneous References Based on a Statistical Model", JCDL 2003, Rice University, Houston, TX, May 27-31, 2003, pp. 49-60.*

Joorabchi, Arash, et al., "An unsupervised approach to automatic classification of scientific literature utilizing bibliographic metadata", Journal of Information Science, vol. 37, No. 5, © 2011, pp. 499-514.*

Takasu, Atsuhiro, et al., "Statistical Analysis of Bibliographic Strings for Construction an Integrated Document Space", ECDL 2002, LNCS 2458, Springer-Verlag, Berlin, Germany, © 2002, pp. 75-90.*

Kim, Jongwoo, et al., "Automated Labeling of Bibliographic Data Extracted From Biomedical Online Journals", Proc. SPIE 5010, Document Recognition and Retrieval X, Santa Clara, CA, Jan. 20, 2003, pp. 47-56.*

Thoma, George R., et al., "Text Verification in an Automated System for the Extraction of Bibliographic Data", DAS 2002, LNCS 2423, Springer-Verlag, Berlin, Germany, © 2002, pp. 423-432.*

Alves, Neide Ferreira, et al., "A Strategy for Automatically Extracting References from PDF Documents", DAS 2012, Gold Coast, Queensland, Australia, Mar. 27-29, 2012, pp. 435-439.*

Kim, Jongwoo, et al., "Automated Labeling in Document Images", Proc. SPIE 4307, Document Recognition and Retrieval VIII, San Jose, CA, Jan. 20, 2001, pp. 111-122.*

Bergmark, Donna, "Automatic Extraction of Reference Linking Information from Online Documents", Cornell University, Computer Science Technical Report No. TR2000-1821, Nov. 30, 2000, 20 pages.*

Apps, Ann, et al., "Why OpenURL?", D-Lib Magazine, vol. 12, No. 5, May 2006, 16 pages.*

Chen et al., "Mobile augmentedd reality for books on a shelf", Multimedia and Expo (ICME), 2011 IEE International Conference on, IEEE, 11 JKuly 2011.

International Search Report and Written Opinion from Related PCT international patent application PCT/US2013/076115 issued May 23, 2014.

European Search Report and Search Opinion from related European patent application serial No. 13865963.6 issued May 31, 2016.

\* cited by examiner

MOBILE-ENABLED SYSTEMS AND PROCESSES FOR INTELLIGENT RESEARCH PLATFORM

RELATED APPLICATIONS

The present application claims priority to U.S. Provisional Patent Application Ser. No. 61/738,725, filed on Dec. 18, 2012, and U.S. Provisional Patent Application Ser. No. 61/789,663, filed on Mar. 15, 2013, the disclosures of which are incorporated by reference herein in their entirety.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever.

TECHNICAL FIELD

Exemplary embodiments of the present disclosure relate to intelligent research platforms such as those including research and authoring productivity software that can be used in conjunction with bibliographic databases and reference searching management software, and more particularly to mobile-enabled workflow systems and processes for providing enhanced access to, and availability of, data and information from cited reference and/or other authoritative databases accessible through intelligent research platforms.

BACKGROUND

Mobile technology is dramatically changing the manner by which people access and consume data and information as well as their expectations with regard to technological capabilities surrounding the mobile paradigm. Consumers of data and information are demanding "always-on," on-the-go, connectivity, and faster and seamless access to data and information in a platform-agnostic manner. The proliferation of smartphones, tablets, subnotebooks and other portable devices is simultaneously driving and answering this demand as improvements in infrastructure strive to keep up. The consumer expectation is that she will be able to effect through a portable computing device the functionality and features of what previously was the sole province of the desktop computer.

In addition to changing the manner in which data and information is obtained, mobile technology is also simultaneously driving and answering the demand for the type and variety of data and information that is available. For example, in the area of scholarly and scientific research and written works, there is a great demand to access and consume vast amounts and varieties of data and content and other information contained in written works of literature, such as books, treatises, legal opinions, journal articles, magazines or other periodicals, manuscripts, and papers presented, submitted and published by society, industry and professional organizations such as in proceedings and transactions publications. One manner by which users of this scholarly and scientific research access and consume this data and information is through "bibliographic citation."

"Bibliographic citation" is a sophisticated process and convention for documenting research, supporting materials and organizing fields of study. In order to facilitate the widespread distribution of information published in scholarly written works to more efficiently and effectively move bodies of study forward, scholars and scientists use bibliographic citation to recognize the prior work of others, or even themselves, on which advancements set forth in their written works are based. A "bibliography" may refer to either of a complete or selective list or compilation of written works specific to an author, publisher or given subject, or it may refer to a list or compilation of written works relied on or considered by an author in preparing a particular written work, such as a paper, article, book or other informational object.

"Citations" or "cited references," as included in any particular work or body of work, is used herein to refer broadly to cited references, bibliographic or other reference data, that collectively form in-text citations, footnotes, endnotes, and bibliographies and are used to identify sources of information relied on or considered by the author and to give the reader a way to confirm accuracy of the content and direction for further study. A citation briefly describes and identifies a cited written work as a source of information or reference to an authority. Citations and bibliographies follow particular formatting conventions to enhance consistency in interpreting the information. Each citation typically includes the following information: full title, author name(s), publication data, including publisher identity, volume, edition and other data, and date and location of publication.

Citations also often include a unique alphanumeric identifier known as a digital object identifier ("DOI"). The DOI system was created by the International DOI Foundation and has been adopted as an International Standard, ISO 26324. A DOI is a character string that is used to uniquely identify electronic documents, including the aforementioned scholarly written work of literatures. Metadata, including a URL or other location of the scholarly written works or other document, is associated with the DOI and stored. While the metadata and URL or other location may change, the DOI is unique and permanent for the document. Thus, a DOI provides a more consistent and stable link for access and retrieval of the document.

The aforementioned scholarly written works may be available through comprehensive reference management systems, such as Thomson Reuters' Web of Knowledge research platform. Such research platforms provide an integrated or integratable system of research and authoring productivity software for use in conjunction with databases of interest to provide access to a vast area of scholarly data and content. For example, Thomson Reuters' commercially-available Web of Science® solution provides citation researching and analysis through bibliographic and citation content and information accessed from commercial, proprietary databases as well as publicly-available citation databases, such as CrossRef and PubMed. These reference management systems may further integrate authoring tools and solutions, for example, Thomson Reuters publishing solutions including EndNote®, EndNote Web®, and Reference Manager®, which are commercially available solutions for creating, writing, publishing, and managing bibliographies, papers, publications, and other scholarly documents.

In view of the increasing demand for "always-on," on-the-go, connectivity, and faster and seamless access to data and information, improved mobile-enabled systems and processes are needed to provide users of scholarly and scientific research access to cited reference and/or other authoritative databases accessible through intelligent research platforms.

SUMMARY

Mobile workflow systems and processes are disclosed for providing enhanced access to, and availability of, data information from cited reference and/or other authoritative databases accessible through intelligent research platforms. Exemplary embodiments of the present disclosure can be utilized to implement image-based retrieval of cited reference data from the authority database(s). Image-based retrieval can include converting an image of text included in a written work into a machine-readable format to facilitate extraction of a unique alphanumeric identifier from the image, which can be used to retrieve cited reference data from the authority database(s)

In accordance with embodiments of the present disclosure, a method of implementing image-based retrieval of a cited reference in a written work is disclosed. The method includes programmatically comparing, by a computer system, a unique alphanumeric identifier extracted from an image taken of a portion of a written work to stored identifiers in an authority database in response to a request received from a portable computing device. The portable computing device has a display, at least one processor, a battery, and an image capture device. The method also includes executing code to retrieve, from the authority database, cited reference data in response to a favorably comparison of the unique alphanumeric identifier to at least one of the stored identifiers associated with a reference stored in the authority database and providing the cited reference data from the computer system to the portable computing device for output on the display of the portable computing device.

In accordance with embodiments of the present disclosure, a computer system for implementing image-based retrieval of a cited reference in a written work is disclosed. The computer system includes one or more computing device. The one or more computing devices have at least one processing device and at least one non-transitory computer-readable medium storing instruction that are executed by the at least one processing device. Execution of the instructions by the at least one processing device causes the processing device to programmatically compare a unique alphanumeric identifier extracted from an image taken of a portion of a written work to stored identifiers in an authority database in response to a request received from a portable computing device. The portable computing device has a display, at least one processor, a battery, and an image capture device. Execution of the instructions by the at least one processing device further causes the processing device to retrieve, from the authority database, cited reference data in response to a favorably comparison of the unique alphanumeric identifier to at least one of the stored identifiers associated with a reference stored in the authority database and provide the cited reference data from the one or more computing devices to the portable computing device for output on the display of the portable computing device.

In accordance with embodiments of the present disclosure, a portable computing device for implementing image-based retrieval of a cited reference in a written work from an authority database is disclosed. The portable computing device includes a non-transitory computer-readable medium, an image capture unit, a processing device and a battery. The non-transitory computer-readable medium stores executable instructions to facilitate an image-based retrieval of a cited reference in a written work from an authority database. The image capture unit configured to capture an image of text included in the written work. The battery supplies power to the non-transitory computer-readable media, the image capture unit, and the processing device. The processing device is operatively coupled to the image capture unit and the non-transitory computer-readable medium and is programmed to execute the executable instructions to interact with the image capture unit to receive the image of the text included in the written work, extract a unique alphanumeric identifier from the image based on a character recognition process performed on the image to convert the text in the image into a machine-readable format, output a request including the unique alphanumeric identifier to a reference management system for retrieval of cited reference data from the authority database, and receive the cited reference data stored the authority database in response to a favorable comparison of the unique alphanumeric identifier with a stored identifier in the authority database. The portable can be a mobile phone or a tablet computing device.

In accordance with embodiments of the present disclosure, the unique alphanumeric identifier can be extracted upon execution of a character recognition process that includes an optical character recognition (OCR) process, an intelligent character recognition (ICR) process, and/or an intelligent word recognition (IWR) process. Extraction of the unique alphanumeric identifier from the image can be performed by a character recognition process implemented by the portable computing device, the computer system, and/or a second computer system that may be separate from or integrated with the computer system. Alphanumeric characters extracted from the image can be parsed to obtain the unique alphanumeric identifier. In some embodiments, the unique alphanumeric identifier can be a digital object identifier.

In accordance with embodiments of the present disclosure, the written work can a scholarly reference publication and the image can include text of the scholarly reference publication. The unique alphanumeric identifier can include alphanumeric characters extracted from the text included in the image and can be used to retrieve cited reference data from an authority database in the form of a cited reference database. The cited reference data can include title, author, and/or publication year information. The cited reference data can be stored in a reference management system by the portable computing device. The reference management system can be integrated with the computer system can include a web-based user interface.

In accordance with embodiments of the present disclosure, a further request can be received by the computer device from the portable computing device if the unique alphanumeric identifier does not compare favorably with the stored identifiers in the authority database, the further request including modified search criteria. The authority database can be searched based on the modified search criteria.

In accordance with embodiments of the present disclosure, an authorization process can be implemented to determine whether a user of the portable computing device is an authorized user and/or an authorization level of a user of the portable computing device. A first subset of the cited reference data can be provided from the computer system based on a first level of authorization of the user and a second subset of the cited reference data can be provided by the computer system based on a second level of authorization of the user. The first and second authorization levels can be based on a subscription service level and the user can be authenticated based on a subscription status. The cited reference data can be optimized for display on a portable computing device if the user of the portable computing device is authorized.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying Figures. In the drawings, like reference numerals refer to like parts throughout the various views of the non-limiting and non-exhaustive embodiments of the present invention, and wherein.

DETAILED DESCRIPTION

Exemplary embodiments of the present disclosure are directed to image based retrieval of cited reference data in response to a captured image from a portion of a written work that includes a unique alphanumeric identifier, which can be utilized to retrieve one or more references from an authority database. Exemplary embodiments of the present disclosure provide an efficient approach to retrieval of cited reference data to provide users demanding "always-on," on-the-go, connectivity, a faster and seamless interface to access cited reference data.

Figure 1:
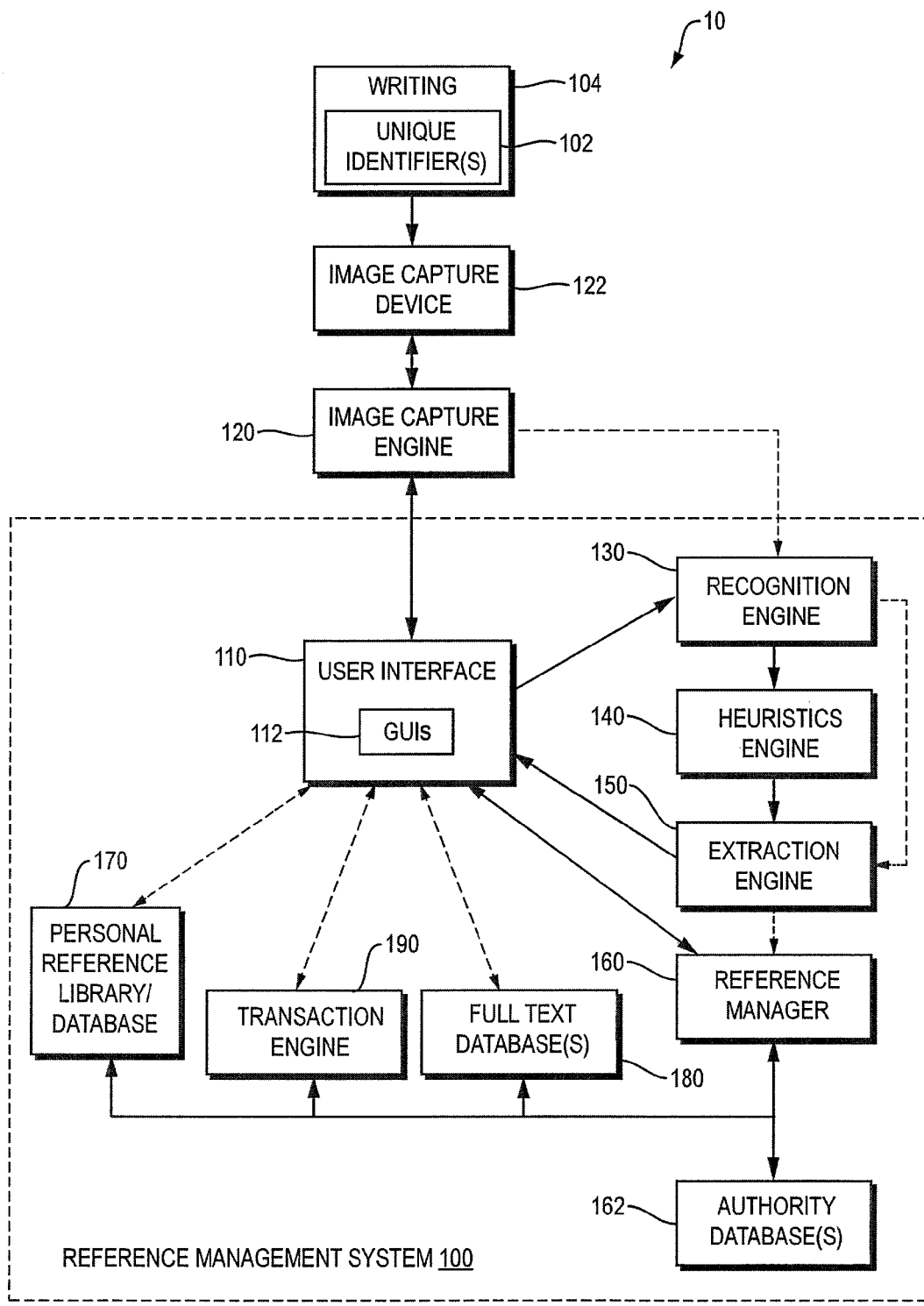
FIG. 1 is a block diagram depicting an exemplary reference management environment in accordance with exemplary embodiments of the present disclosure.

FIG. 1 is a block diagram depicting an exemplary reference management environment 10 implemented in accordance with exemplary embodiments of the present disclosure to facilitate searching, identifying, and/or retrieving of bibliographic information and/or one or more full text versions of one or more references based on a captured image of unique alphanumeric identifier(s) 102 included in a written work 104 (image-based reference retrieval). Exemplary embodiments of the environment 10 can include a reference management system 100 that can be implemented using hardware, software, and/or a combination thereof. As one example, in some embodiments, one or more computing devices can be programmed and/or configured to implement exemplary embodiments of the system 100 or portions thereof. The system 100 can include a user interface 110 that is in communication with an image capture engine 120, which controls an image capture device 122; a recognition engine 130; a heuristics engine 140; an extraction engine 150; a reference manager 160 communicatively coupled to authority database(s) 162; a personal reference library 170; a full text database 180; and a transaction/subscriber engine 190.

The unique alphanumeric identifier 102 can be a string of alphanumeric characters (e.g., text and numbers). In exemplary embodiments, the unique alphanumeric identifier 102 can be, for example, a digital object identifier ("DOI"), an International Standard Book Number (ISBN), a Pubmed Identifier/Pubmed Central Identifier, a CAS Registry number, and/or any other suitable unique alphanumeric identifiers that can be utilized to retrieve reference citations within a work. An ISBN is a unique commercial book identifier that is assigned to a book and is based upon a nine digit Standard Book Numbering (SBN) code. A Pubmed Identifier/Pubmed Central Identifier is a document identification schema for the Pubmed database of the U.S. National Library of Medicine. A CAS Registry number is a chemical abstract identification number for a commercial chemical abstracts database from the American Chemical Society. The term "alphanumeric" is used broadly herein to refer to unique identifiers formed of letter/characters from one or more origins or alphabets (e.g., Latin, Chinese, Japanese, etc.), numbers/digits from one or more origins (e.g., Arabic), and/or a combination of letters/characters and numbers/digits.

The written work 104 can be any written work of literature that incorporates a unique alphanumeric identifier that can be used to identify and/or retrieve a reference to and/or within the written work of literature. For example, the written work 104 can be an article (e.g., academic article, industry article, journal article), book, periodical, thesis, dissertations, grant proposals, patent applications, patents, and the like. The unique alphanumeric identifiers 102 can be embedded on or in the written works 104 and can be surrounded by or incorporated into the content of the written works 104 such that an image capture of the unique alphanumeric identifier 102 can also include other content of the written work 104 such that the unique alphanumeric identifier may need to be distinguished from the other content and extracted independently from the other content.

The user interface 110 can be programmed and/or configured to provide one or more graphical user interfaces (GUIs) 112 through which a user can interact with the system 100. The GUIs 112 displayed to users can include data entry areas to receive information from the user; user-selectable elements or areas that can be selected by the user to cause the system 100 to perform one or more operations, functions, and/or processes; and/or can include data outputs to display information to the user. In exemplary embodiments, the user interface can be utilized by a user to interface with the engines 120, 130, 140, and 150, as well as the reference manager 160, the personal reference library 170, the full text database 180, and the transaction engine 190.

The image capture engine 120 can be programmed and/or configured to control the image capture device 122 (e.g., a digital still camera) to capture an image of a portion of the written work 104 that includes the unique alphanumeric identifier 102 in response to user input received via the user interface 110. The image captured by the image capture device can be provided to the user interface 110, which can display the image to the user and/or provide the image as an input to the recognition engine 130. In some embodiments, the image can be automatically provided to the recognition engine 130 and/or can be provided to the recognition engine 130 in response to an input from the user received via the user interface 110. In some embodiments, the image capture engine 120 can provide the image to the recognition engine 140 directly.

The recognition engine 130 can receive the image captured by the image capture device 122 from the image capture engine 120 and/or the user interface 110. In exemplary embodiments, the recognition engine 130 can be programmed and/or configured to convert the captured image into machine-encoded data or textual elements. The recognition engine 130 can utilize optical character recognition (OCR) processes, intelligent character recognition (ICR) processes, and/or an intelligent word recognition (IWR) processes to identify and extract data or textual elements from the captured image.

The data/textual elements can be provided to the heuristics engine 140, which can be programmed and/or configured to perform one or more processes to identify the unique alphanumeric identifier 102 formed by the extracted data/textual elements. For example, the heuristics engine 140 can be programmed and/or configured to recognize patterns and/or signatures associated with one or more types of unique alphanumeric identifiers to identify a unique alphanumeric identifier formed by at least some of the data/textual elements extracted from the captured image. As one example, the heuristics engine 140 can search the data/textual elements for groups of data/textual elements having a quantity of elements that corresponds to a quantity of elements in one or more specified types of unique alphanumeric identifiers and/or can identify whether the elements in each identified group include a specified type of data/textual elements in a specified order or position within the group. As another example, the heuristics engine 140 can be programmed and/or configured to search multiple authority databases in a specific order based on the patterns found in the data/textual elements extracted from the captured image. In some embodiments, the heuristics engine 140 can be programmed and/or configured to limit searching to a specific subset of fields within specific authority databases based on the patterns found in the data/textual elements extracted from the captured image.

The extraction engine 150 can be programmed and/or configured to extract the unique alphanumeric identifier from the data/textual elements. For example, heuristic engine 140 can provide the extraction engine 150 with the unique alphanumeric identifier 102 based on the processes performed by the heuristic engine 140 and the extraction engine 150 can provide the unique alphanumeric identifier to the user interface 110, which can display the unique alphanumeric identifier to the user and/or can provide the reference management system 160 with the unique alphanumeric identifier 102. In some embodiments, the extraction engine 150 can receive the data/textual elements from the recognition engine 130 directly and can be programmed and/or configured to identify and extract the unique alphanumeric identifier 102 from the data/textual elements.

In exemplary embodiments, the extraction engine 150 can be programmed and/or configured to execute code or scripts that are used to parse the extracted textual/data elements to determine whether a unique alphanumeric identifier is present in a captured image. For example, the extraction engine 150 can determine whether there are any unique alphanumeric identifiers that correspond to one or more predefined types of unique alphanumeric identifiers. If so, the extraction engine can provide the user interface 110 with the unique alphanumeric identifier, which can provide the unique alphanumeric identifier to the reference manager 160 to facilitate retrieval of bibliographic information associated with the unique alphanumeric identifier and/or to facilitate retrieval of a full text version of a reference associated with the unique alphanumeric identifier. In some embodiments, the extraction engine 150 can provide the unique alphanumeric identifier to the reference manager 160 directly. If a unique alphanumeric identifier is not detected, the extraction engine 150 provide a notification to the user interface that a unique alphanumeric identifier was not detected or that the process to obtain the unique alphanumeric identifier otherwise failed. In some embodiments, the extraction engine 150 can be programmed and/or configured to interact with the reference manager to suggest possible unique alphanumeric identifiers if an exact match has not been to a predefined type of unique alphanumeric identifier has not been detected.

Upon receipt of the unique alphanumeric identifier 102, the reference manager 160 can perform as search of one or more of the authority databases for stored identifiers corresponding to the unique alphanumeric identifier 102. For example, the reference manager 160 can search for an instance of the unique alphanumeric identifier or like identifiers stored by one or more of the authority databases. In some embodiments, the reference manager 160 can include search criteria that includes the unique alphanumeric identifier as well as other parameters to facilitate retrieval not only of reference corresponding to an exact match between the unique alphanumeric identifier and the stored identifier, but to also facilitate the retrieval of other references that have stored identifiers that are similar to the unique alphanumeric identifier. Using this approach, the reference manager 160 can return the reference having a stored identifier that exactly matches the unique alphanumeric identifier 102 captured from the written work 104, one or more references having stored identifiers that are similar to the unique alphanumeric identifier 102, or both, which can be provided to the user interface 110 for display to the user. If the reference manager 160 does not return any references based on the search, the reference manager 160 can instruct the user interface that no results were found and the user interface 110 can be programmed and/or configured to request further search information from the user, such as author information, title information, publisher information, publication dates, and/or any other suitable information that can be utilized by the reference manager 160 to query the authority database(s) 162 for references.

The authority database(s) 162 can include proprietary and/or public databases in which unique alphanumeric identifiers are assigned to data structures including bibliographic information and/or full written works, which can be utilized to consistently, uniquely, and unambiguously identify the bibliographic information and/or the full written works. Bibliographic information and full-text versions of written works can be collectively and/or independently referred to herein as cited reference data. The authority databases can include cross references and/or logical linkages to other data structures including related or similar written works, e.g., based on authorship, titles, publishers, abstracts, publication year, and the like. Some examples of authority databases include, for example, the Web of Science, Web of Knowledge, Cortellis, Biological Abstracts, and/or Thomson Reuters Innovation provided by Thomson Reuters, as well as, PubMed from the National Center for Biotechnology Information (NCBI), AMJUR, Crossref.org, JSTOR from ITHAKA, and/or BioOne.

After the reference manager 160 returns one or more references based on a query of one or more of the authority databases 162, the user can store one of more of the reference in the personal reference library 170 for subsequent use via the user interface 110 and/or can retrieve a full text version of the reference from the full text database 180. The personal reference library 170 can include one or more references stored by a user in the user's account. The full text database 180 can receive a request from the user via the user interface to retrieve a complete version of the written work returned by the search performed by the reference manager 160. In some embodiments, the reference manager 160 can automatically store the reference(s) returned by the search in the personal reference library and/or can automatically query the full text database 180 to retrieve and return the full text version of the reference to the user.

In some embodiments, a fee may be associated with access the reference manager 160, the personal data library 170, and/or the full text database 180. In these embodiments, the user interface 110 can interact with a transaction engine 190. The transaction engine 190 can be programmed and/or configured to facilitate payment of fees to permit access to the reference manager 160, the personal reference library, and/or the full text database 180. For example, a user can interface with the system 100 via the user interface 110, but before the user is given access to the reference manager and/or the full text database the user can be required to open an account via the transaction engine. In some embodiments, the full text database 180 can also be an authority database.

Figure 2:
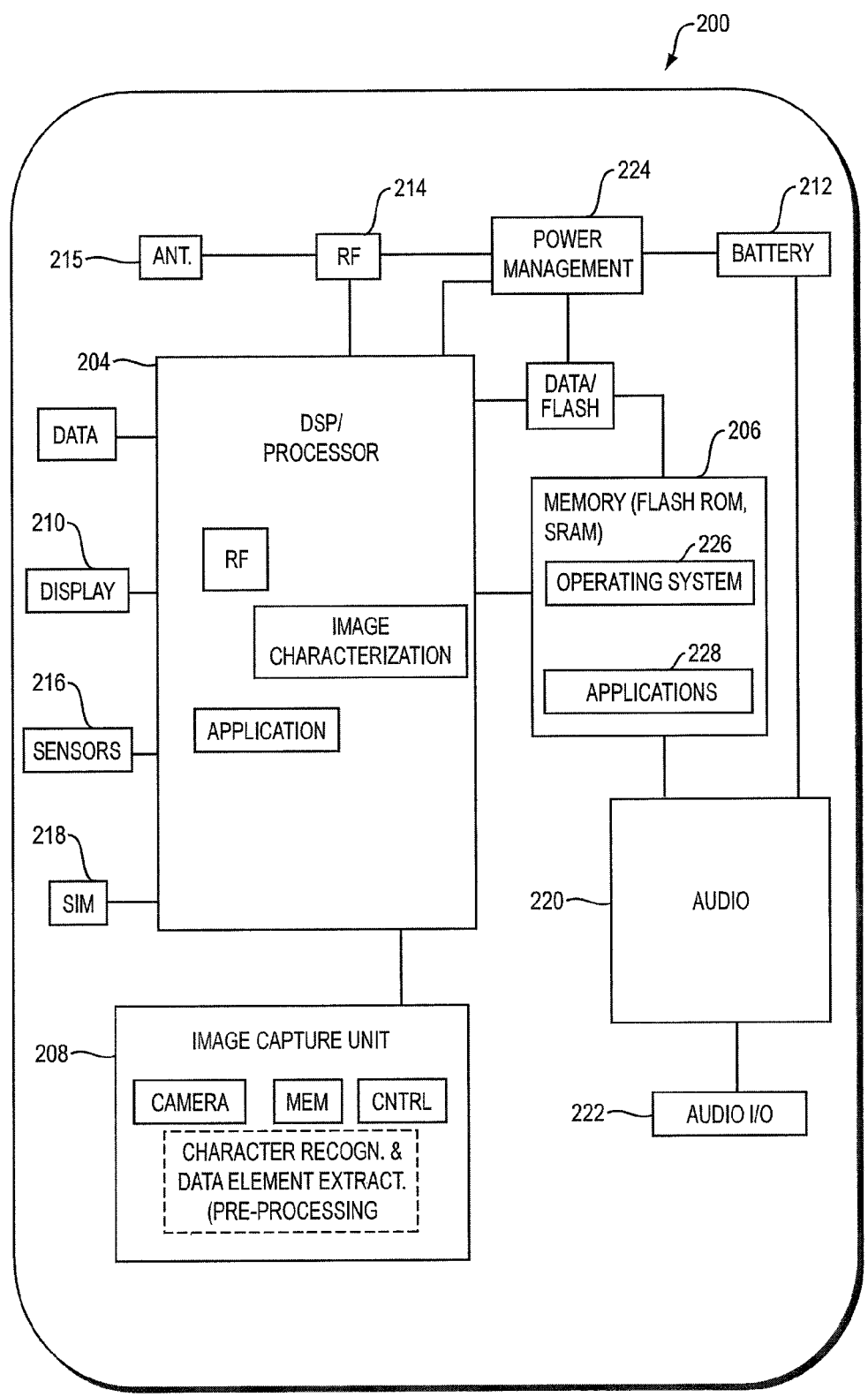
FIG. 2 is a block diagram of a portable computing device that can be utilized to interact with a reference management system in accordance with embodiments of the present disclosure.

FIG. 2 is a block diagram of a portable computing device 200 that can be utilized to implement and/or interact with embodiments of the reference management system 100. The portable computing device 200 can be a smartphone, tablet, subnotebook, laptop, personal digital assistant (PDA), and/or any other suitable portable computing device that includes or can be operatively connected to an image capture device and can be programmed and/or configured to implement and/or interact with embodiments of the reference management system 100. The portable computing device 200 can include a processing device 204, such as a digital signal processor (DSP) or microprocessor, memory/storage 206 in the form a non-transitory computer-readable medium, an image capture unit 208, a display unit 210, a battery 212, and an radio frequency transceiver 214. Some embodiments of the portable computing device 200 can also include other common components commonly, such as sensors 216, subscriber identity module (SIM) card 218, audio components 220 and 222, and power management circuitry 224.

The memory 206 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 226 and applications 228 can be embodied as computer-readable/executable program code stored on the non-transitory computer-readable memory 206 and implemented using any suitable, high or low level computing language and/or platform, such as, e.g., Java, C, C++, C#, assembly code, machine readable language, and the like. In some embodiments, the applications 228 can include an image application configured to interact with the image capture unit, a web browser application, a mobile application specifically coded to interface with embodiments of the reference management system 100, the engines 130, 140, and/or 150. While memory is depicted as a single component those skilled in the art will recognize that the memory can be formed from multiple components and that separate non-volatile and volatile memory device can be used.

The processing device 204 can include any suitable single- or multiple-core microprocessor of any suitable architecture that is capable of implementing and/or facilitating an operation of the portable computing device 200. For example, to perform an image capture operation, transmit the captured image (e.g., via the RF transceiver 214), transmit/receive a unique alphanumeric identifier included in the captured image (e.g., via the RF transceiver 214), display data/information including GUIs 112 of the user interface 110, captured images, unique alphanumeric identifiers, bibliographic information, full text versions of references, and the like. The processing device 204 can be programmed and/or configured to execute the operating system 226 and applications 228 (e.g., image application and engine 130, 140, and 150) to implement one or more processes to perform an operation. The processing device 204 can retrieve information/data from and store information/data to the storage device 206. For example, the processing device can retrieve and/or store captured images, unique alphanumeric identifiers included in the captured images, bibliographic information, full text versions of references, and/or any other suitable information/data that can be utilized by the portable computing device and/or the user.

The RF transceiver 214 can be configured to transmit and/or receive wireless transmissions via an antenna 215. For example, the RF transceiver 214 can be configured to transmit data/information, such as one or more images captured by the image capture unit and/or unique alphanumeric identifiers included in the captured images, directly or indirectly, to one or more servers and/or to receive data/information, such as a unique alphanumeric identifier, bibliographic information corresponding to a unique alphanumeric identifier, and/or full text versions of references corresponding to unique alphanumeric identifiers, directly or indirectly, from one or more servers. The RF transceiver 214 can be configured to transmit and/or receive information having at a specified frequency and/or according to a specified sequence and/or packet arrangement.

The display unit 210 can render user interfaces, such as graphical user interfaces to a user and in some embodiments can provide a mechanism that allows the user to interact with the GUIs. For example, a user may interact with the portable computing device 200 through display unit 210, which may be implemented as a liquid crystal touch-screen (or haptic) display, a light emitting diode touch-screen display, and/or any other suitable display device, which may display one or more user interfaces (e.g., GUIs 112) that may be provided in accordance with exemplary embodiments.

The power source 212 can be implemented as a battery or capacitive elements configured to store an electric charge and power the portable computing device. In exemplary embodiments, the power source 212 can be a rechargeable power source, such as a battery or one or more capacitive elements configured to be recharged via a connection to an external power supply.

In some embodiments, the portable computing device can implement an OCR or other character/word recognition process via an execution of the image capture engine 120 and/or an execution of one of the applications 228. In these embodiments, the image capture unit 208 can include a pre-processing character recognition and data element extraction unit as part of the image capture engine 120 that works in conjunction with one of the applications 228 stored in main memory of the portable computing device to convert the captured imaged into machine-encoded data or text and parse the extracted text/data elements. In some embodiments, the portable computing device 200 can include an image characterization unit 230 utilized by the processing device 204 to determine the "texture" of the document whose image is being captured (e.g., type of paper). In response to this determination, the processing device 204 can assign an appropriate imaging algorithm to the image capture to improve the image recognition process and to minimize or reduce potential errors and/or faults in the image recognition process.

Figure 3:
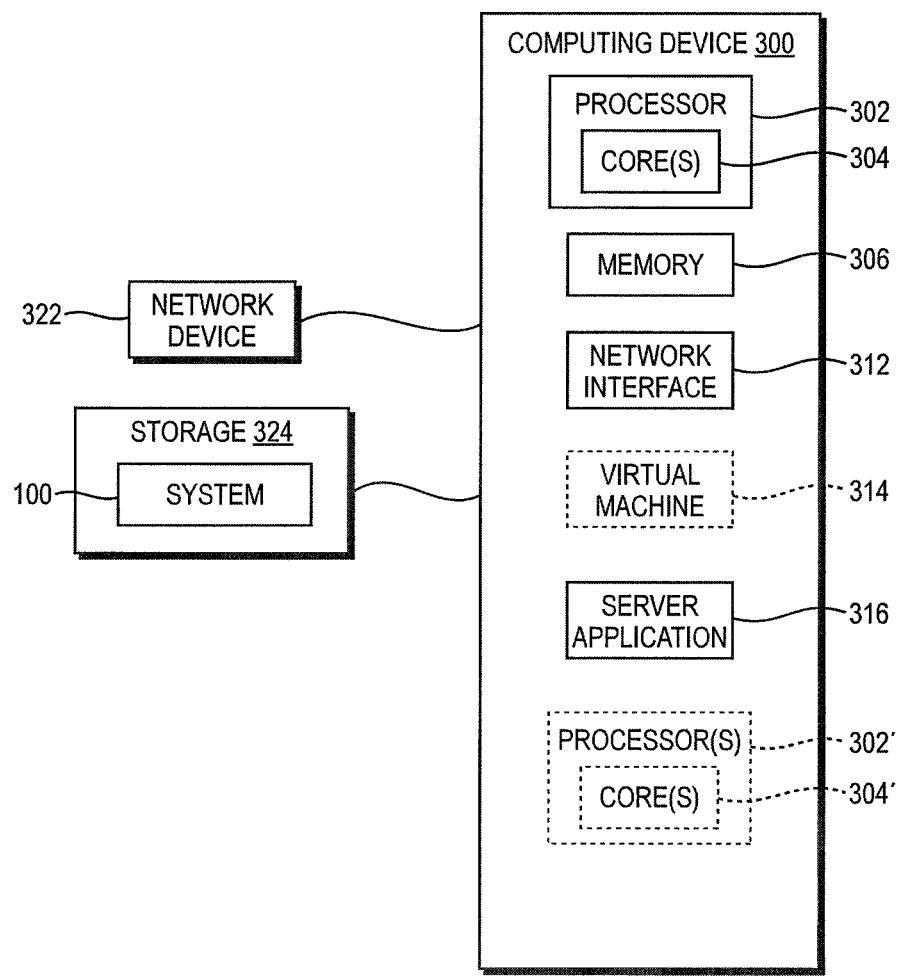
FIG. 3 is a block diagram of an exemplary computing device that can be utilized to implement a reference management system, or portions thereof, in accordance with exemplary embodiments of the present disclosure.

FIG. 3 is a block diagram of an exemplary computing device 300 that can be utilized to implement embodiments of the reference management system 100 or portions thereof. In the present embodiment, the computing device 300 is configured as a server that is programmed and/or configured to execute one of more of the operations and/or functions of the reference management system 100 and to facilitate communication with a portable computing device, such as embodiments of the portable computing device 200. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the system 100 or portions thereof. The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device may be shared dynamically. A virtual machine 314 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

The computing device 300 may also include one or more storage devices 324, such as a hard-drive, CD-ROM, mass storage flash drive, or other computer readable media, for storing data and computer-readable instructions and/or software that can be executed by the processing device 302 to implement exemplary embodiments of the system 100 described herein.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. While the computing device 300 depicted in FIG. 3 is implemented as a server, exemplary embodiments of the computing device 300 can be any computer system, such as a workstation, desktop computer or other form of computing or telecommunications device that is capable of communication with other devices either by wireless communication or wired communication and that has sufficient processor power and memory capacity to perform the operations described herein.

The computing device 300 may run any server application 316, such as any of the versions of server applications including any Unix-based server applications, Linux-based server application, any proprietary server applications, or any other server applications capable of running on the computing device 300 and performing the operations described herein. An example of a server application that can run on the computing device includes the Apache server application.

Figure 4:
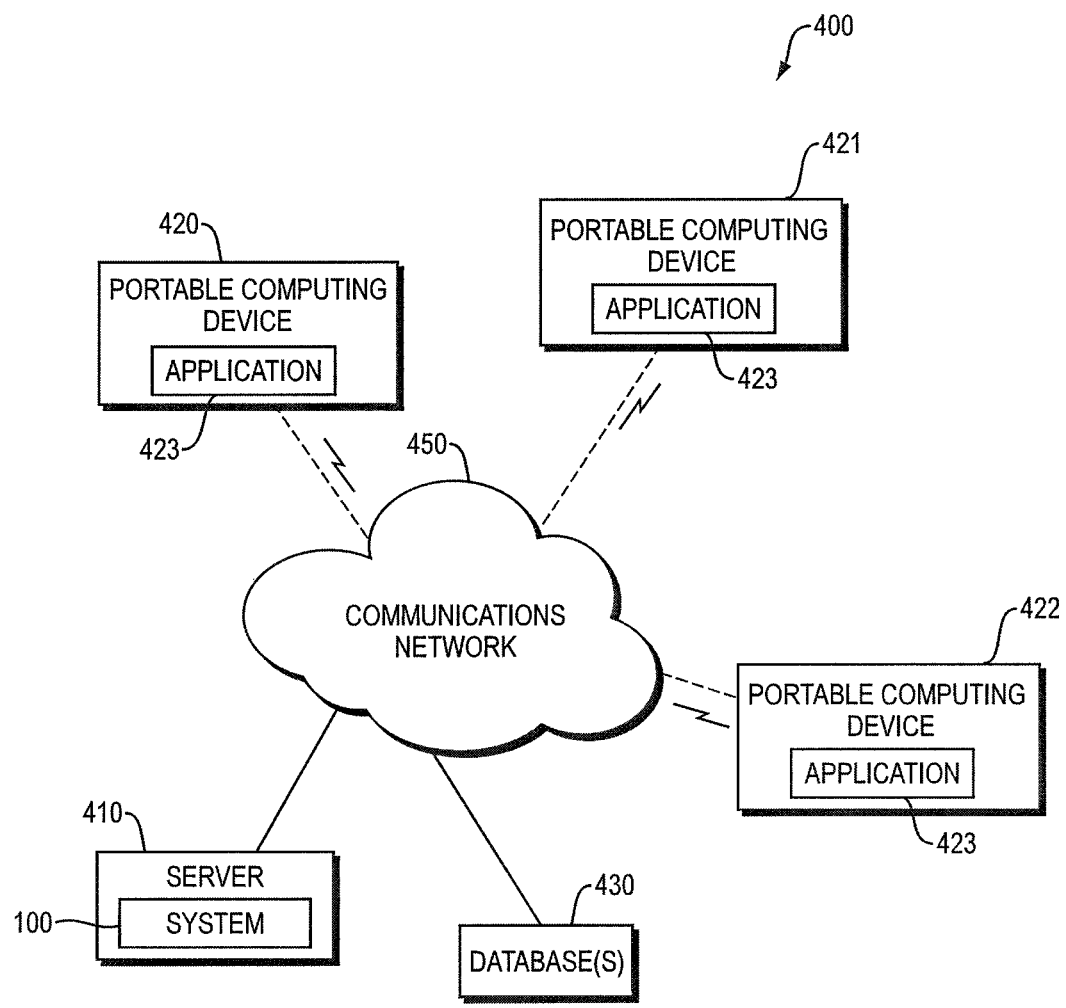
FIGS. 4-9 depict schematic diagrams presenting configurations of hardware and software components and services to implement a reference management environment in accordance with exemplary embodiments of the present disclosure.

FIG. 4 is a schematic diagram presenting a system configuration of and software components/service to implement an exemplary embodiment of the system 100 in a client-server environment 400. As shown in FIG. 4, the environment 400 includes a server 410 operatively coupled to (portable computing device) clients 420-422 via a communication network 450, which can be any network over which information can be transmitted between devices communicatively coupled to the network. For example, the communication network 450 can be the Internet, Intranet, virtual private network (VPN), wide area network (WAN), local area network (LAN), and the like. Embodiments of the server 410 can be implemented in a manner similar to the computing device 300 of FIG. 3 and the clients 420-422 can be implemented in a manner similar to the portable computing device 200 of FIG. 2.

In an exemplary embodiment, the system 100 can be implemented by the server 410. The server 410 can be implemented as a web server that hosts the user interface of the system 100, which can be accessed by the clients 420-422 to display GUIs of the user interface on displays of the clients 420-422, which can be used to facilitate image-based retrieval of bibliographic information and/or full text versions of references associated with a unique alphanumeric identifiers included in images captured by the clients 420-422.

As shown in FIG. 4, the clients 420-422 can each include a client side application 423 programmed and/or configured to interact with the server 410 to access and execute the environment 100. In some embodiments, the client-side application 423 implemented by one or more of the clients 420-422 can be a web-browser capable of navigating to one or more web pages hosting GUIs of the system 100. In some embodiments, the client-side application 423 implemented by one or more of the clients 420-422 can be an application specific to the system 100 that is installed on the clients 420-422 to permit interaction with the system 100 being executed by the server 410.

In an exemplary operation, the clients 420-422 can be operated by users to capture images of portions of written work that include unique alphanumeric identifiers associated with written work or references cited within the written work. For example, the users can access the system via the clients 420-422 to display a GUI on the display of the clients 420-422 that provides an interface for capturing an image. After the image is captured, the clients 420-422 can transmit the image to the server 410 (either wirelessly or through a wire) via the communication network 450. The system being executed by the server can convert the captured imaged into machine-encoded data or textual elements, which can be parsed to detect unique alphanumeric identifiers included in the captured image. In some embodiments, heuristics can be used to perform an analysis of the data/textual elements to aid in the detection of the unique alphanumeric identifiers. If a unique alphanumeric identifier has been detected, the system 100 can instructed the server 410 to display the unique alphanumeric identifier to the user via a GUI for confirmation.

The system 100 can include and/or interface with one or more authority databases and/or full text databases (e.g., database(s) 430) to retrieve bibliographic information and/or a full text version of the reference associated with the unique alphanumeric identifier in response to a confirmation from the user and/or automatically (e.g., without requiring conformation from the user). Once the system 100 retrieves the bibliographic information and/or full text, the bibliographic information and/or full text can be made available to the user via a GUI displayed in the client device 420-422 via the server 410. The users can control the clients 420-422 to view the bibliographic information and/or full text, save the bibliographic information and/or full text to the users' personal reference library maintained by the system. In some embodiments, the system provides the user with the bibliographic information by default and the user must separately request the full text version of the reference.

Figure 5:
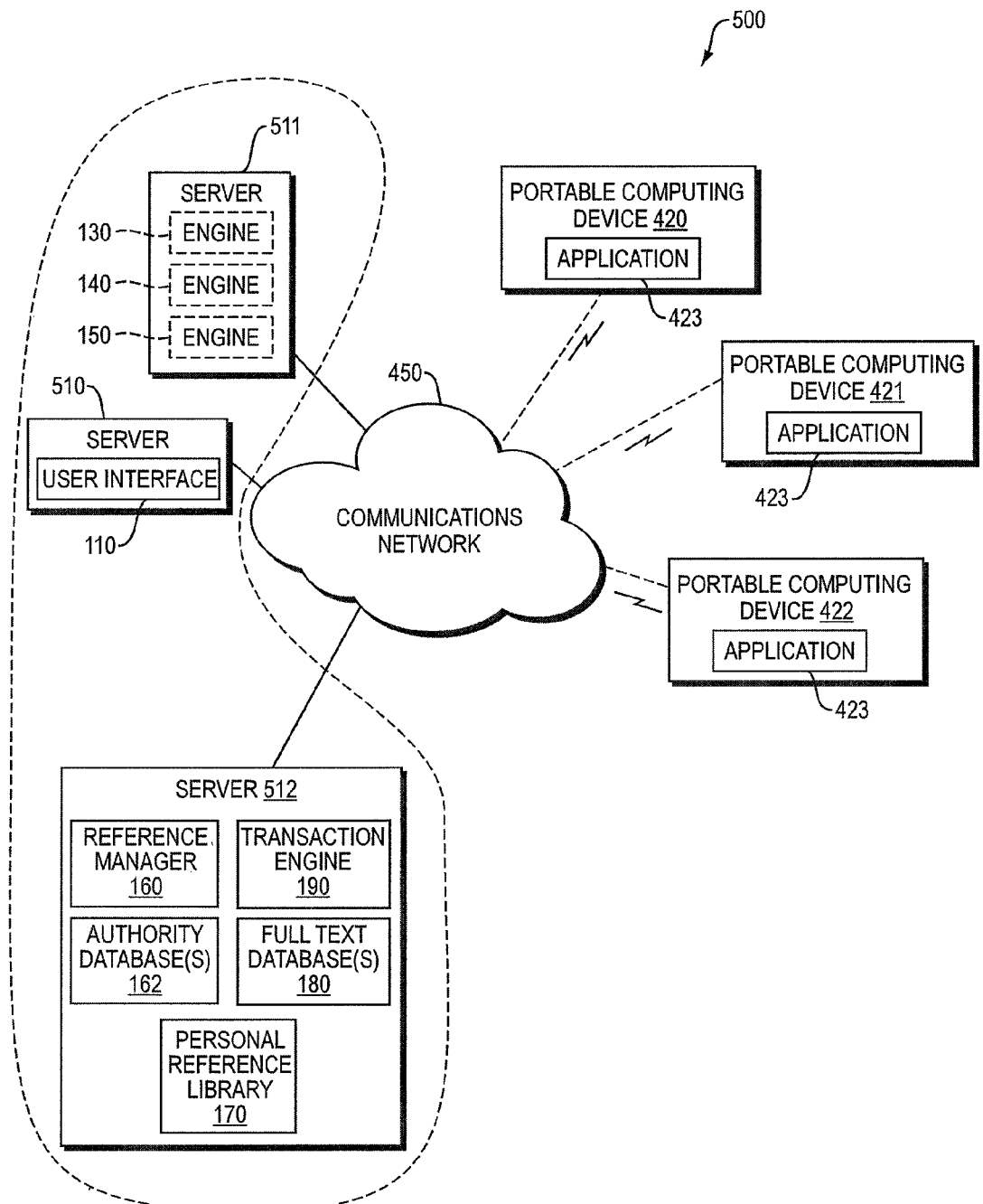

FIG. 5 is a schematic diagram presenting a system configuration of and software components/service to implement an exemplary distributed embodiment of the system 100 in a client-server environment 500. As shown in FIG. 5, the environment 500 includes servers 510-512 operatively coupled to the clients 420-422 via the communication network 450. Embodiments of the servers 510-512 can be implemented in a manner similar to the computing device 300 of FIG. 3.

In an exemplary embodiment, the system 100 can be distributed across the servers 510-512. For example, the server 510 can implement the user interface 110, the server 511 can implement the recognition engine 130, the heuristics engine 140, and the extraction engine 150, and the server 512 can implement the reference manager 160, at least some of the authority databases 162, the personal reference library 170, the full text database(s) 180, and the transaction/subscriber engine 190. In the present embodiment, one or more of the servers 510-512 can be implemented as a web server. For example, the server 510 can be implemented as a web server that hosts the user interface 110 of the system 100, which can be accessed by the clients 420-422 to display GUIs of the user interface on displays of the clients 420-422, which can be used to facilitate image-based retrieval of bibliographic information and/or full text versions of references associated with a unique alphanumeric identifiers included in images captured by the clients 420-422.

An exemplary operation of the distributed system 100 shown in FIG. 5 is similar to the operation of the system shown in FIG. 4, except that different servers perform different functions or operations of the system. For example, the users can access the system via the server 510 to display a GUI on the display of the clients 420-422 that provides an interface for capturing an image. After the image is captured, the clients 420-422 can transmit the image to the server 510 (either wirelessly or through a wire) via the communication network 450 and the server 510 can be programmed and/or configured to transmit the captured image to the server 411 for processing. In some embodiments, the client side application 423 can be programmed and/or configured to transmit the captured image to the server 511 without first transmitting the captured image to the server 510. The server 411 can execute the engine 130, 140, and 150 to convert the captured imaged into machine-encoded data or textual elements, which can be parsed to detect unique alphanumeric identifiers included in the captured image, which can be submitted to the reference manager 160 being executed by the server 412. If a unique alphanumeric identifier has been detected, the reference manager can instruct the server 410 to display the unique alphanumeric identifier to the user via a GUI for confirmation.

The reference manager 160 can interface with one or more authority databases and/or full text databases to retrieve bibliographic information and/or a full text version of the reference associated with the unique alphanumeric identifier in response to a confirmation from the user and/or automatically (e.g., without requiring conformation from the user). Once the reference manager 160 retrieves the bibliographic information and/or full text, the bibliographic information and/or full text can be made available to the user via a GUI displayed in the client device 420-422 via the server 410. The users can control the clients 420-422 to view the bibliographic information and/or full text, save the bibliographic information and/or full text to the users' personal reference library maintained by the server 512. In some embodiments, the reference manager 160 provides the user with the bibliographic information by default and the user must separately request the full text version of the reference maintained by the full text database 180 on the server 412.

Figure 6:
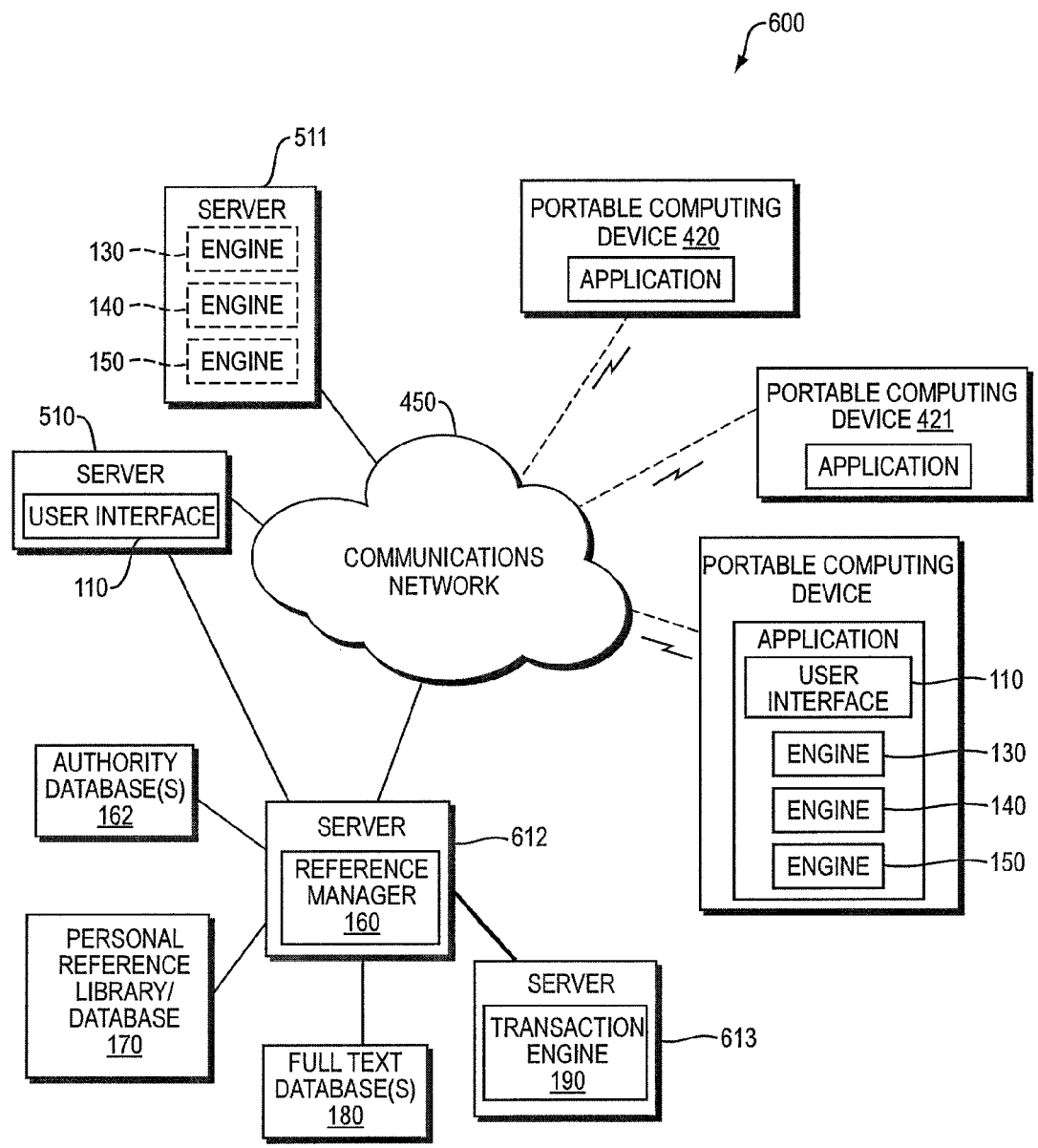

FIG. 6 is a schematic diagram presenting a system configuration of and software components/service to implement an exemplary distributed embodiment of the system 100 in a client-server environment 600 in which at least one client implements at least a portion of the system 100. As shown in FIG. 6, the environment 600 includes the servers 510-511 and 612 operatively coupled to the clients 420-421 and the client 622 via the communication network 450. Embodiments of the server 612 can be implemented in a manner similar to the computing device 300 of FIG. 3 and embodiments of the client 622 can be implemented in a manner similar to the portable computing device 200 of FIG. 2.

In an exemplary embodiment, the system 100 can be distributed across the servers 510-511 and 612 as described above in FIG. 5 except that the authority databases 162, personal reference library 170, full text databases 180, and transaction server (e.g., on a server 613) do not reside on the server 612, but rather are operatively connected to the server 612. As shown in FIG. 6, the client 622 can each include a client side application 623 that is programmed and/or configured to be specific to the system 100 (e.g. a mobile application for the system 100) that includes the user interface 110, the recognition engine 130, the heuristics engine 140, and the extraction engine 150. The client 622 can be programmed and/or configured to interact with the server 510 and together the client 622 and the server 612 can form an embodiment of the system 100, while the clients 420-421 operate as described with respect to FIG. 5.

In an exemplary operation, the client 622 can be operated by a user to capture an image of a portion of written work of literature that include at least one unique alphanumeric identifiers associated with the written work of literature or references cited within the written work of literature. For example, the client 622 can execute the user interface 110 to display a GUI on the display of the client 622 that provides an interface for capturing an image. After the image is captured, the client 622 can execute the engines 130, 140, and 150 to detect the unique alphanumeric identifier in the captured image by converting the captured imaged into machine-encoded data or textual elements and parsing the data/textual elements. The user interface can be executed by the client 622 to display the unique alphanumeric identifier to the user via a GUI for confirmation.

After the unique alphanumeric identifier is detected, the clients 622 can transmit the unique to the server 612 (either wirelessly or through a wire) via the communication network 450 and the server 612 can be programmed and/or configured to process the unique alphanumeric identifier by executing the reference manager 160. The reference manager 160 can interface with one or more authority databases 162 and/or full text databases 190 to retrieve bibliographic information and/or a full text version of the reference associated with the unique alphanumeric identifier. Once the reference manager 160 retrieves the bibliographic information and/or full text, the bibliographic information and/or full text can be made available to the user via a GUI displayed in the client device 622 via the user interface 110. The users can control the client 622 to view the bibliographic information and/or full text, save the bibliographic information and/or full text to the users' personal reference library 170. In some embodiments, the reference manager 160 provides the user with the bibliographic information by default and the user must separately request the full text version of the reference maintained by the full text database 180.

FIGS. 7-15 are generally directed to a non-limiting example of implementing a reference management environment in accordance with exemplary embodiments of the present disclosure with respect to the Web of Knowledge research platform. While FIGS. 7-15 describe a non-limiting example of an exemplary embodiment of the present disclosure, those skilled in the art will recognize that exemplary embodiments of the present disclosure can be implemented to form and/or be incorporated into any reference management environment in which unique alphanumeric identifiers identifying a written work or a reference to a written work are associated with or affixed to written works.

Figure 7:
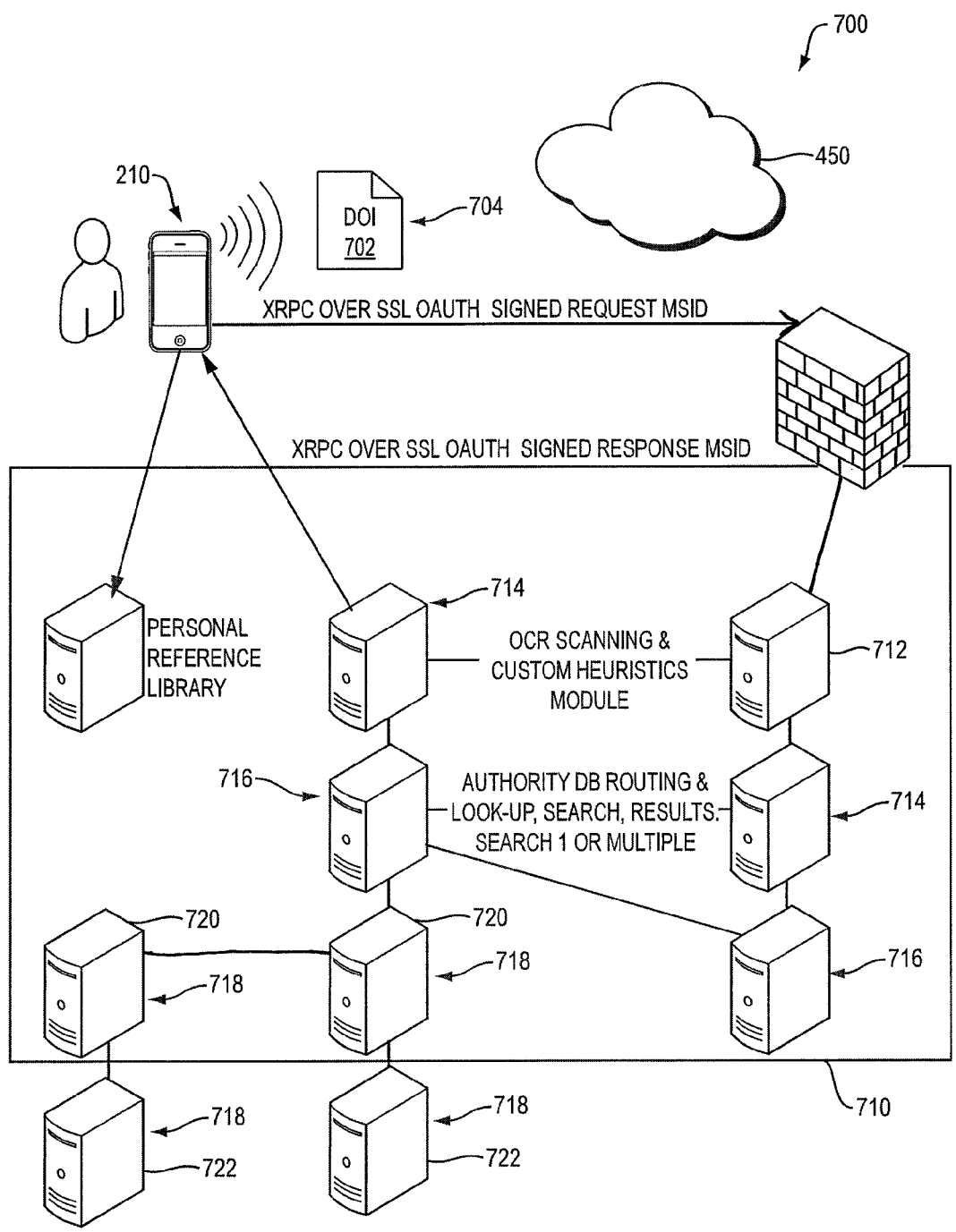

FIG. 7 is a schematic diagram presenting a system configuration of hardware and software components and services to implement an exemplary embodiment of a reference management environment 700. A portable computing device 210 can communicate with a reference management system 710 via the communications network 450. The portable computing device 210 can be a smartphone, tablet, subnotebook, laptop, personal digital assistant (PDA), and/or any other suitable portable computing device that includes or can be operatively connected to an image capture device (e.g., image capture device 122) and can be programmed and/or configured to communicate with servers of the reference management system 710 over a communications network. The portable computing device 210 and one or more servers of the reference management system 710 can be programmed and/or configured to communicate using one or more transports layers and encoding methods, such as eXtensible Mark-Up Language—Remote Procedure Call (XML-RPC) implementation, an XML Remote Procedure Call (XRPC) over Secure Socket Layer (SSL) implementation, an XML over Hypertext Transfer Protocol (HTTP) communication implementation, Simple Object Access Protocol (SOAP) implementation, and the like.

As shown in FIG. 7, the system 710 can include an authentication module 712 that can receive a request for bibliographic information and/or the full-text of a written work and can determine whether the portable computing device is authorized to interact with the environment 700 (e.g., based on a username and/or password entered into the portable computing device). The authentication process can be applied to the user prior to allowing to access the system 710. The authentication may require registration with a component of the system 710, such as the reference management component of the environment (e.g., Thomson Reuters' EndNote® Web). In some embodiments, after the user has been authenticated or authorized, the user may download to the portable computing device a client-side application specific to the system 710 that can be used by the user to obtain bibliographic information and/or full-text versions of references associated with a unique alphanumeric identifier included in a captured image. In some embodiments, the user may not be required to download and utilize a client-side application specific to the system 710, but instead may utilize a web browser application on the portable computing device 210. In some embodiments, the authentication process can be implemented prior to receiving a request including a captured image.

In exemplary embodiments, the authentication module 712 can be configured to execute an authorization process to determine whether a user of the portable computing device is an authorized user and/or to determine an authorization level of a user of the portable computing device. For example, in some embodiments, the user can be authorized and/or authenticated base on a subscription status associated with the user (e.g., is the user a subscriber and is the user's account current). User accounts can have different subscription level that can determine which authority databases are available to the user and/or which cited reference data in the authority databases are available to the user. That is, there can be different user authorization levels for different subscription levels (e.g., a first authorization level can be associated with a first subscription service level and a second authorization level can be associated with a second subscription service level). Users having a first authorization level can be provided a first subset of the cited reference data from the reference management system and a user having a second authorization level can be provided a second subset of cited reference data from the reference management system. In some embodiments, the cited reference data can be optimized for display on a portable computing device if the user of the portable computing device is authorized.

The request can include an image of a portion of a tangible written work formed on paper or other suitable material. The image can include a unique alphanumeric identifier 702 corresponding to the a referenced work in the tangible written work 704 that the user of the portable computing device 210 would like to retrieve via the environment 700. Upon a determination that the request is authorized, the authentication module 712 can interface with an alphanumeric character recognition module 714 that can include an embodiment of the recognition engine, the heuristics engine, and the extraction engine (FIG. 1). The alphanumeric character recognition module 714 can convert the image captured by, and received from, the portable computing device 210 into machine-encoded data or text that can be parsed to extract the unique alphanumeric identifier captured in the image and provided to a Web of Knowledge reference manager module 716, which can interface with one or more authority databases 718, a throttling module 714, and an electronic commerce (e-commerce) module 716.

The reference manager module 716 can construct one or more queries to search the authority databases based on the unique alphanumeric identifier extracted from the image. In exemplary embodiments, one or more of the authority databases 718 can be proprietary databases 720 internal to the system 710 and/or one or more of the authority databases 718 can be public and/or proprietary databases 722 external to the system 710, but to which the system 710 has access. One or more of the authority databases 718 can return one or more results based on the unique alphanumeric identifier, and the results can be transmitted from the system 710 to the portable computing device 210.

The throttling module 714 can be programmed and/or configured to manage incoming traffic to the environment 700 to provide a mechanism to control communications congestion by optimizing a performance of the environment based on the data traffic being serviced by the environment 700, for example, by stopping and/or disabling one or more operations, functions, or task performed by the environment. The congestion control throttle of the module 714 can be automatically enabled when the number of anonymous users currently visiting the site exceeds the specified threshold. The congestion control throttle can be automatically enabled when the number of authenticated users currently visiting the site exceeds the specified threshold.

The e-commerce module 716 can be programmed and/or configured to implement an embodiment of the transaction engine (FIG. 1) to facilitate financial transactions between the system 710 and the portable computing device 210. For example, the system 710 may require that users in the environment 700 have a subscription to access the system 710, may charge a fee for each search request received by the system 710, and/or may charge a fee if the user wishes to access a full-text version of a written work corresponding to a unique alphanumeric identifier included in the request.

The modules and/or databases described with respect to FIG. 7 can each be implemented as servers in the system 710. In some embodiments, one or more of the modules and/or databases can be incorporated or integrated into a server such that the server implements more than one of the modules.

While the system 710 of the present embodiment performs the character recognition process, those skilled in the art will recognize that the character recognition process can be implemented by the portable computing device 210 and/or by a service external to the system 710. In these embodiments, the request provided by the user can include the extracted unique alphanumeric identifier and/or the machine-encoded data or text from the image.

Figure 8:
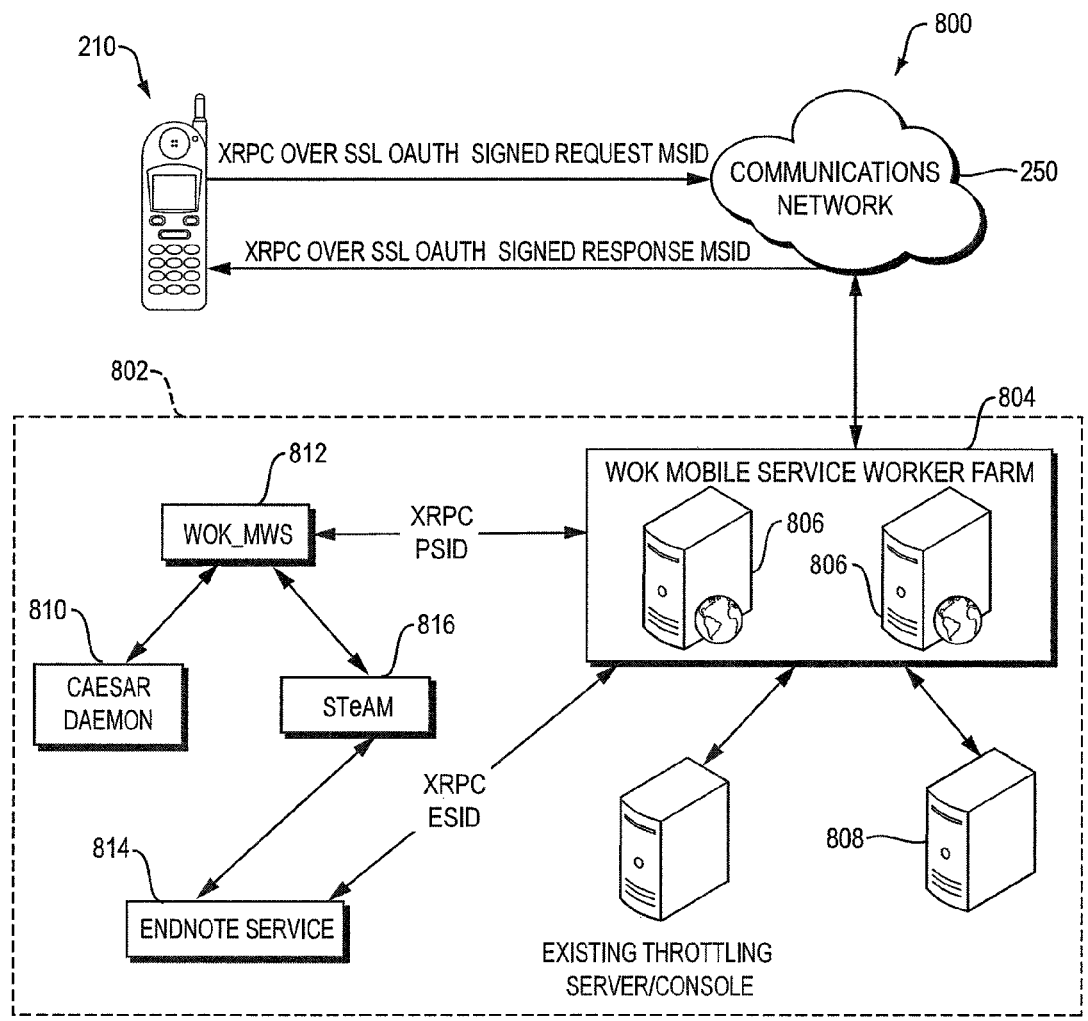

FIG. 8 is a schematic diagram presenting a system configuration of hardware and software components and services to implement an exemplary embodiment of a reference management environment 800, which can include a comprehensive reference management system 802, such as the Web of Knowledge research platform from Thomson Reuters. In the present embodiment, the portable computing device 210 can communication with the environment 800 via the communication network 250. The system 802 can include a server farm 804 including servers 806 executing code for the reference management system 802. In one embodiment, the server farm 804 can be programmed and/or configured to implement an authentication process prior to allowing a user of the portable computing device 210 to access the reference management system 802.

The authentication process may require registration with a component of the system, such as a reference management software component (e.g., Thomson Reuters' EndNote® Web). The authentication process can include an authentication request sent to the server farm 804 by the portable computing device. If the server farm 804 operating in conjunction with an authentication server 808 determines that the user is authorized to access the reference management system 802, the server farm 804 can return a Mobile Session Identifier (MSID) to create a session between the portable computing device 210 and the environment 800. The MSID can utilized in the communications between the portable computing device 210 and the server farm 804 during the session to ensure that the portable computing device 210 can access the system 802. The MSID can be maintained and/or controlled by a daemon application 810 that executes on the server farm 804 in the background of an exemplary embodiment of the reference manager 812 and interacts with the reference manager system 812 being executed by the sever farm 804.

Once the user has been authenticated or authorized, the user, via the portable computing device 210 can interact with the system 802 to retrieve bibliographic information and/or a full-text version of one or more references cited in a tangible written work based on an image captured of at least a portion of the written work by an image acquisition device of the portable computing device as described herein. Bibliographic information and/or full-text versions of references returned by the system 802 in response to the search request can be stored in the portable computing device 210 or remotely from the portable computing device 210 for example, in a component 814 of the comprehensive reference management system 810 (e.g., EndNote® Web) for later retrieval, email, and/or printing.

In some embodiments, a commercial rights management application 816 can be executed by the sever farm 804. The application 816 can be utilized by the reference management system 810 to ensure that the copyrights of written works are protected and/or respected by users of the system 802, e.g., based on rights management data associated with the written works.

Figure 9:
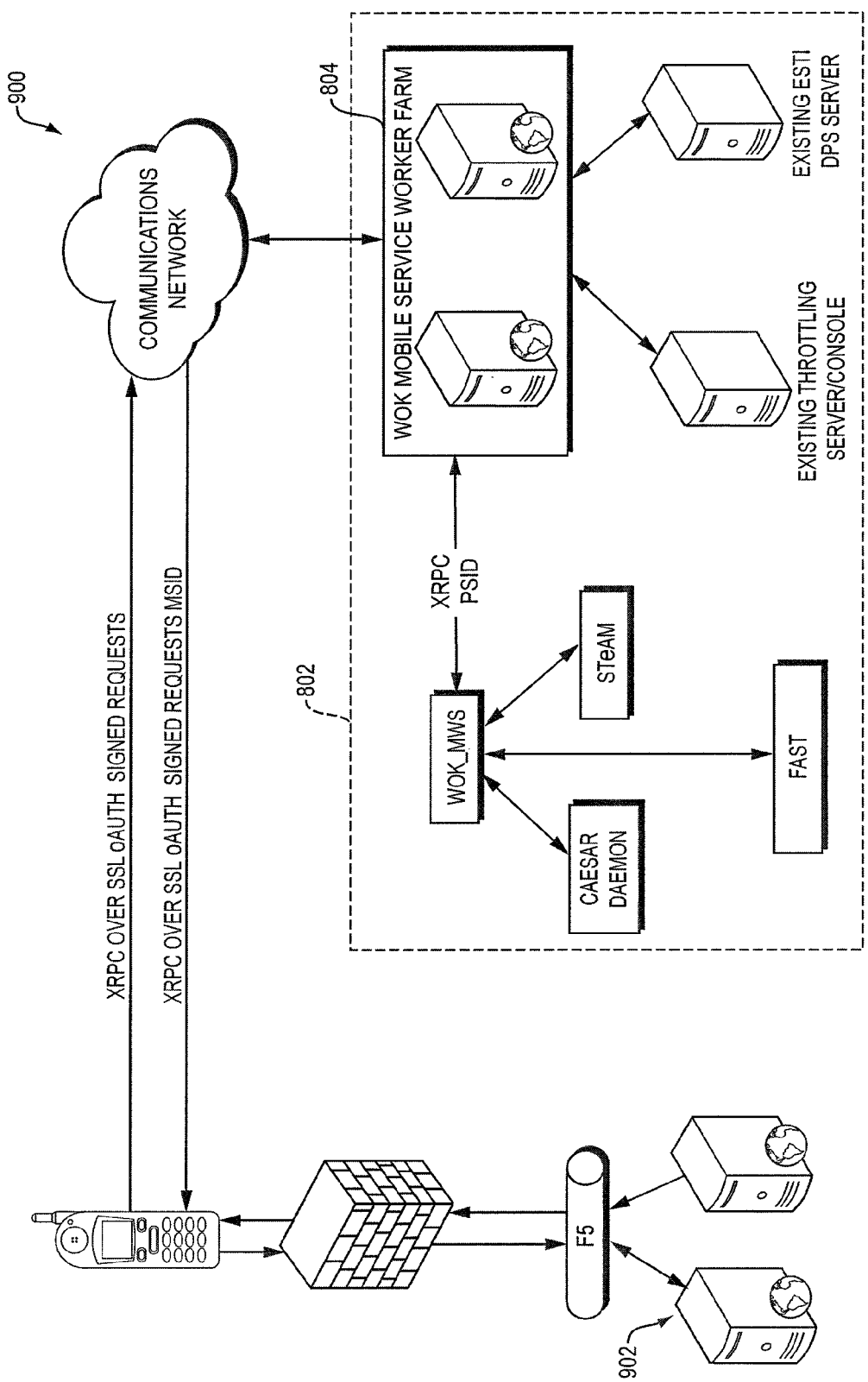

FIG. 9 is a schematic diagram presenting a system configuration of hardware and software components and services to implement an exemplary embodiment of a reference management environment 900, which can be a comprehensive reference management, such as the Web of Knowledge research platform from Thomson Reuters. The environment 900 can be implemented in a substantially similar manner as the environment 800 of FIG. 8, except that the character recognition process can be implemented on server(s) 902 externally from the server farm 804 and may be implemented within or externally to the system 802.

Figure 10:
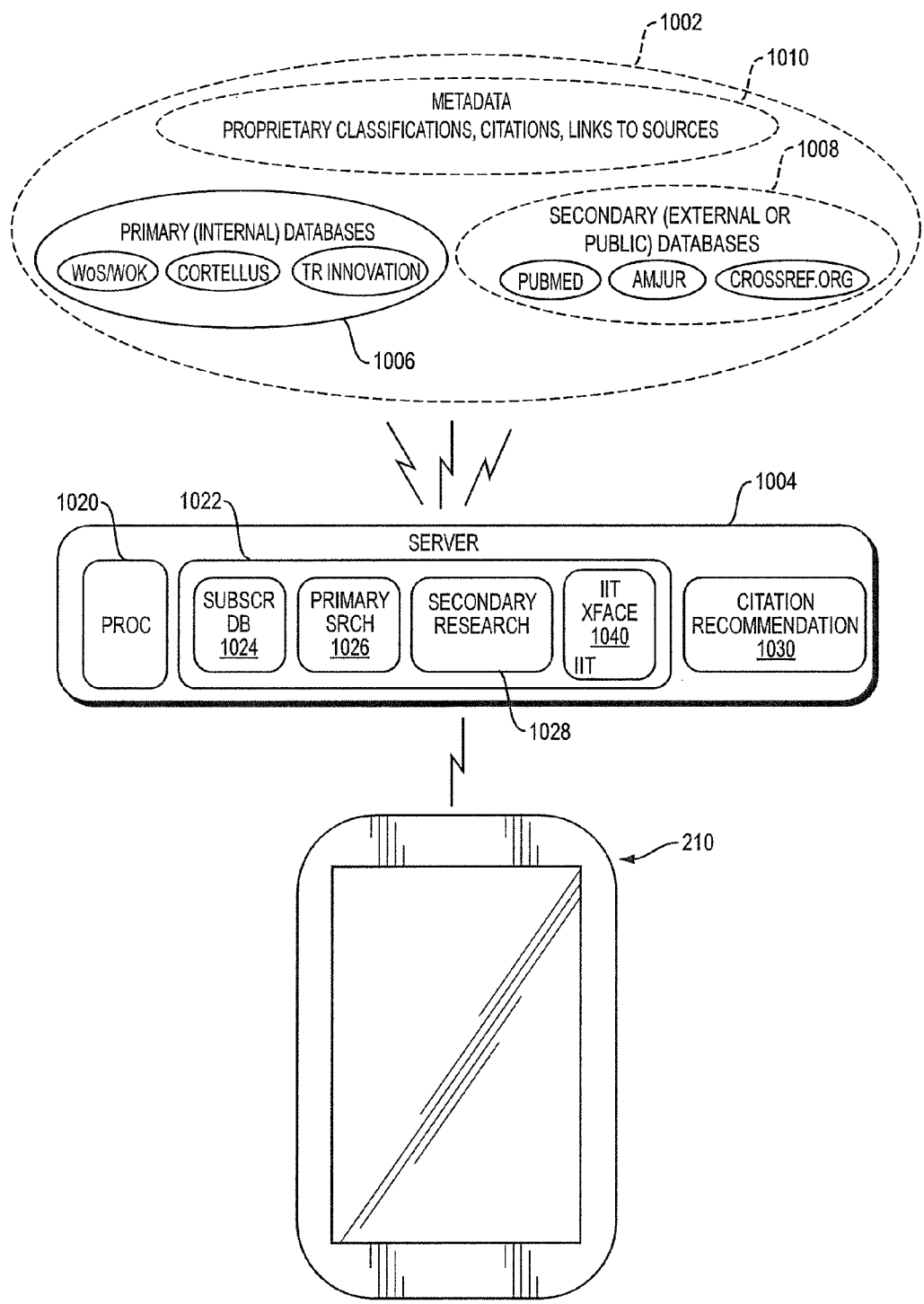
FIG. 10 depicts an exemplary embodiment of online information-retrieval and analysis components of a comprehensive reference management system in accordance with exemplary embodiments of the present disclosure.

FIG. 10 depicts an exemplary embodiment of online information-retrieval and analysis components of a comprehensive reference management systems (e.g., Thomson Reuters Web of Knowledge®) having a client-server architecture that includes a set of databases 1002 or data storage units and a server system 1004, which may be accessed by the portable computing device 210. The databases 1002 can include a set of primary databases 1006, a set of secondary databases 1008, and a set of metadata databases 1010, which represent resources relied on by users, such as researchers, scholars, students and other professionals. Primary databases 1006 may be proprietary, subscription-based, or internal to a service provider, such as Thomson Reuters Web of Science® and Web of Knowledge® database(s), Cortellus, and a Thomson Reuters Innovation database(s). The secondary databases 1008 may be external or public databases that represent further resources of interest to a group of users and may supplement authorities to those offered by the primary database 1006. In one embodiment, the secondary databases 1008 can include, for example, a PubMed database, a AMJUR database, and a Crossref.org database. The metadata databases 1010 can include, for example, citation relationships, abstracts, links, classification data, and other source data associated with written works. As described herein, exemplary embodiments of the present disclosure can include databases that include written works having content that relates to legal, research, financial, scientific, and/or health-care information, as well as any other written works having any other content that includes unique alphanumeric identifiers that can be used to identify and retrieve references cited within the written works or to identify and retrieve the written works themselves.

The databases 1002 may be one or more electronic, magnetic, or optical data-storage devices, include or are otherwise associated with respective indices (not shown). Each of the indices includes terms and phrases in association with corresponding document addresses, identifiers, and other conventional information. The databases 1002 are coupled or coupleable via a wireless or wired communications network, such as a local-, wide-, private-, or virtual-private network, to the server(s) as described herein.

The server system 1004, which is generally representative of one or more servers for serving data in the form of webpages or other markup language forms with associated applets, ActiveX controls, remote-invocation objects, or other related software and data structures to service clients of various "thicknesses." More particularly, in one embodiment the server system 1004 can include a processor module 1020, a memory module 1022, a subscriber database 1024, a primary search module 1026, metadata research module 1028, and a user-interface module 1030. The processor module 1020 may include one or more local or distributed processors, controllers, or virtual machines. In one embodiment, processor module 1020 can assume any convenient or desirable form as known to those of skill in the art. The memory module 1022, which may be one or more electronic, magnetic, or optical data-storage devices, can store subscriber database 1024, primary search module 1026, secondary search module 1028, and citation recommendation module 1030.

The subscriber database 1024 includes subscriber-related data for controlling, administering, and managing pay-as-you-go or subscription-based access of databases 1002. The subscriber database 1024 may include one or more user preference (or more generally) user data structures. In one embodiment, one or more aspects of the user data structure relate to user customization of various search and interface options. To this end, some embodiments of the present disclosure can include user profile information such as biographical information, institution association (e.g., university, corporation, society, etc.), area of practice or study or research (e.g., asthma, allergy), and prior publications. User data may be used to authenticate user credentials and grant access to subscriber-based resources or work spaces. For seamless access across multiple platforms and/or services or resources an integrated credentialing service may be used, e.g., Thomson Reuters' OnePass solution.

The primary search module 1026 can include one or more search engines and related user-interface components, for receiving and processing data against one or more of the databases 1002. In some embodiment, one or more search engines associated with search module 1026 provide Boolean, term frequency—inverse document frequency (tf-idf), and/or natural-language analysis capabilities. The secondary search module 1028 can also include one or more search engines for processing data against one or more of databases 1002.

In some embodiments, the server system 1004 can include the citations recommendation module 1030 to recommend citations to a user based on a request received by the user via the portable computing device 210. For example, the user may capture an image including a unique alphanumeric identifier that can be utilized by the server to search one or more of the databases 1002. In response to the search, the server system 1004 can return a set of references that may be or interest to the user, may be related to reference associated with the unique alphanumeric identifier, may be cited in the reference associated with the unique alphanumeric identifier, and the like.

In some embodiments, the server system 1004 can include an information-integration-tools (IIT) framework module 1040 (or software framework or platform). The IIT framework module can include machine readable and/or executable instruction sets for wholly or partly defining software and related user interfaces having one or more portions thereof that integrate or cooperate with one or more document-processing (or document authoring or editing) applications, such as word processing applications, email applications, presentation applications, and spreadsheet applications. In some embodiment, these applications can be hosted on one or more accesses devices, e.g., the portable computing device 210.

Figure 11:
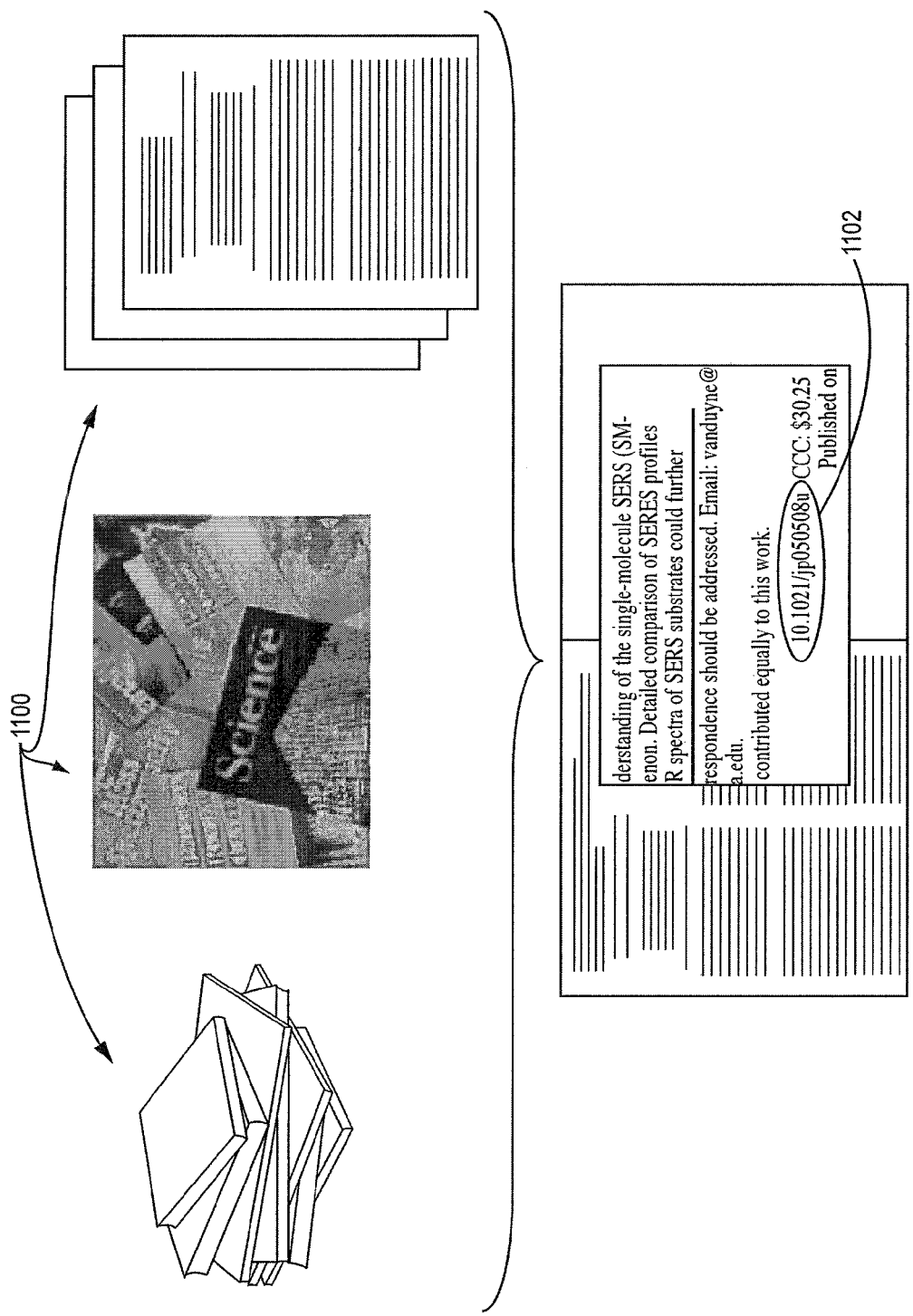
FIG. 11 illustrates non-exhaustive examples of written works of literature that can be utilized in accordance with exemplary embodiments of the present disclosure.

FIG. 11 illustrates non-exhaustive examples of written works of literature 1100 that can be utilized in accordance with exemplary embodiments of the present disclosure. An exemplary unique alphanumeric identifier 1102 in the form of a DOI is shown for one of the written works 1100. As shown in FIG. 11, the unique alphanumeric identifier 1102 can included in the text of the written work. The text of the written work 1100 can surround the unique alphanumeric identifier 1102 such that it may not be possible or practical to only capture the unique alphanumeric identifier 1102 in an image for use with exemplary embodiments of the present disclosure. As described herein, exemplary embodiments of the present disclosure can utilize heuristic processing to process machine-enabled data or text resulting from a character recognition process being executed on a captured image and distinguish the unique alphanumeric identifier from the surrounding text.

Figure 12:
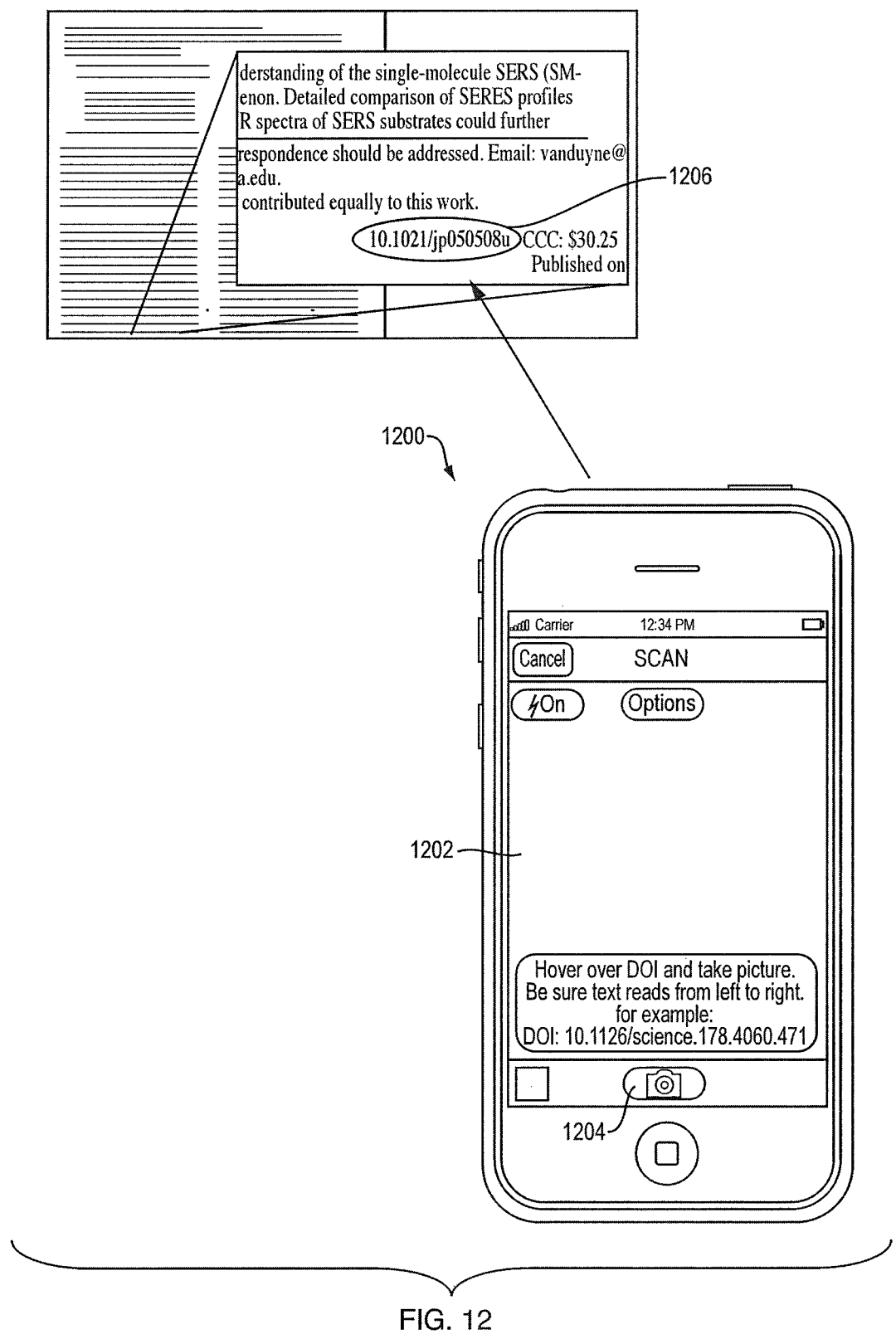
FIG. 12 illustrates an exemplary image acquisition interface rendered on a portable computing device in accordance with exemplary embodiments of the present disclosure.

FIG. 12 illustrates an exemplary image acquisition interface 1202 rendered on a portable computing device 1200 in accordance with exemplary embodiments of the present disclosure. A user of the portable computing device 1200 who desires to electronically access a scholarly written work from a comprehensive reference management system can hold the image acquisition device of the portable computing device over the citation, including a unique alphanumeric identifier 1206 and take a picture by selecting the control 1204 to capture an image include the unique alphanumeric identifier 1206. In accordance with exemplary embodiments of the present disclosure, the captured image can be converted into machine-encoded data or text using a character recognition process, such as a character recognition process implemented by optical character recognition (OCR) software, intelligent character recognition (ICR) software, intelligent word recognition (IWR) software, and the like.

The character recognition software can include supporting scripts that are used to parse the extracted text/data elements to determine whether a unique alphanumeric identifier is present. If so, the unique alphanumeric identifier, bibliographic information related to the unique alphanumeric identifier, and/or a full-text version of a reference related to the unique alphanumeric identifier can be returned to the user. Otherwise, an indication that no unique alphanumeric identifier was found or that the process to obtain the unique alphanumeric identifier otherwise failed. Alternatively, or in addition, exemplary embodiments of the present disclosure may communicate that an exact match has not been found and may suggest possible alternates to the user via the portable computing device.

Figure 13:
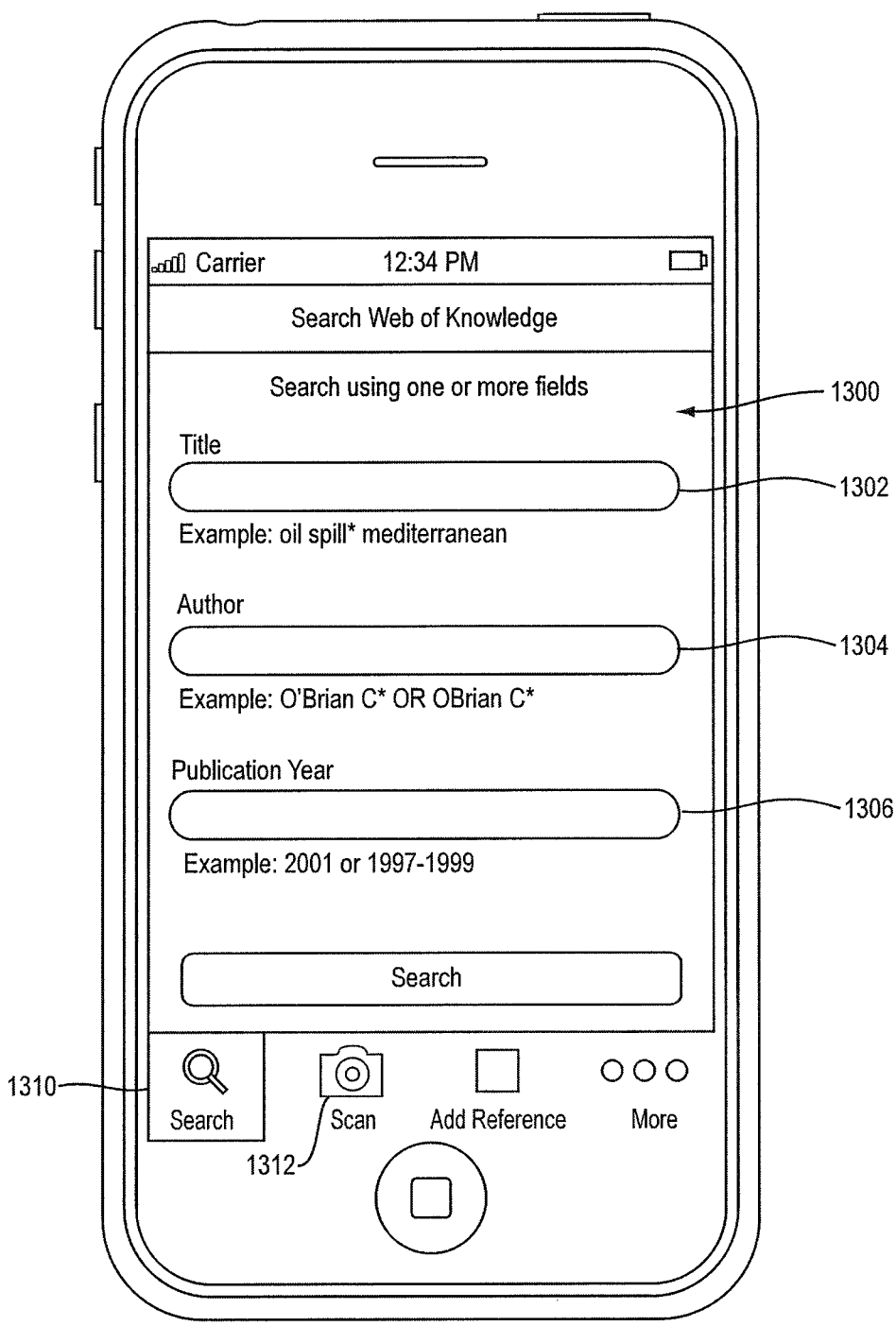
FIGS. 13 and 14 illustrate exemplary graphical user interfaces that can be rendered on a display of a portable computing device in accordance with exemplary embodiments of the present disclosure.
Figure 14:
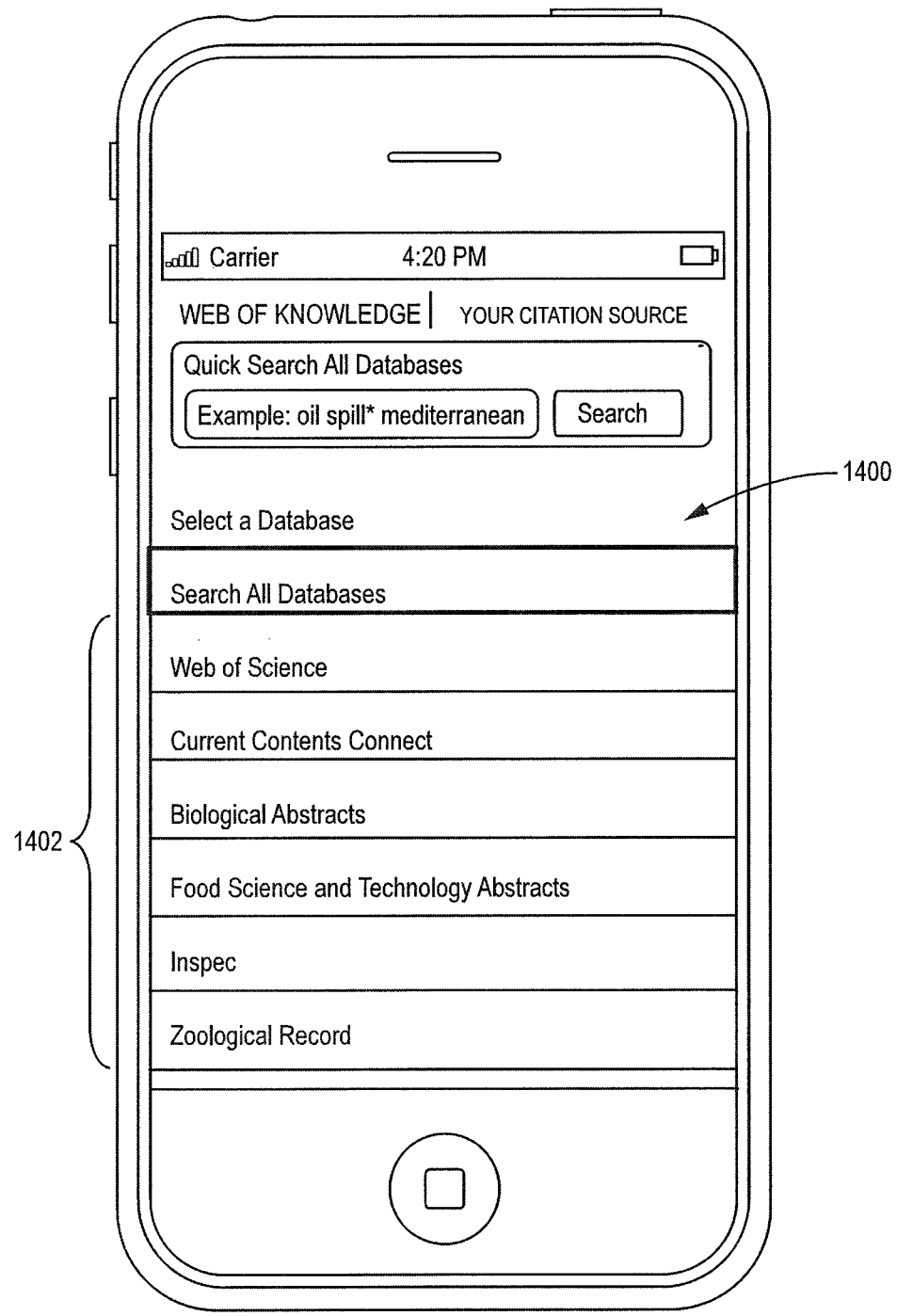

FIGS. 13 and 14 illustrate exemplary graphical user interfaces 1300 and 1400, respectively, that can be rendered on a display of a portable computing device 1350 (e.g., a smartphone, tablet) and that may be used in conjunction with exemplary embodiments of the present disclosure. The GUIs 1300 and 1400 provide a search interface that allows a user of the portable computing device 1350 interface with exemplary embodiments of the reference management systems described herein. As one example, with reference to FIG. 13, the interface 1300 allows a user of the portable computing device 1350 to search at least one of the one authority databases by specifying citation data, such as a title 1302, an author 1304, a publication year 1306, and/or any other suitable citation data. As another example, with reference to FIG. 14, the interface 1400 can also be programmed and/or configured to allow the user to specify or select which authority databases 1402 to search. Although FIG. 13 shows searching by title, author and publication year, it will be appreciated that other citation data may be included (e.g., publisher identity, volume, edition, etc.) as known to those of skill in the art. As shown in FIG. 13, the interface 1300 can be displayed to the user upon selection of a manual search button 1310 and the user can navigate to the interface 1202 of FIG. 12 upon selection of the scan button 1312.

In exemplary embodiments, the reference management systems and/or client-side applications described herein can be executed to render the interface 1300 and/or 1400 on a display of the portable computing device 1350 in response to a determination by the reference management system that no unique alphanumeric identifier was included in the captured image that is utilized to facilitate searching of the one or more authority databases and/or that a unique alphanumeric identifier detected in a captured image does not match or relate to any of the bibliographic information and/or full-text written works stored in the authority databases. In some embodiments, the interfaces 1300 and/or 1400 can be provided to allows the user to perform a manual search of the authority databases by entering search criteria such as author information, publisher information, title information, publication year information, a unique alphanumeric identifier, and the like.

In some embodiments, the reference management systems and/or client-side applications described herein can be executed to render the interface 1300 and/or 1400 on a display of the portable computing device 1350 and can automatically populate at least one or more of the data entry/search fields for the user based on a unique alphanumeric identifier included in a captured image to allow the user of the portable computing device to submit a broader search based on, for example, a title, an author, a publication year, and/or any other suitable citation data.

Figure 15:
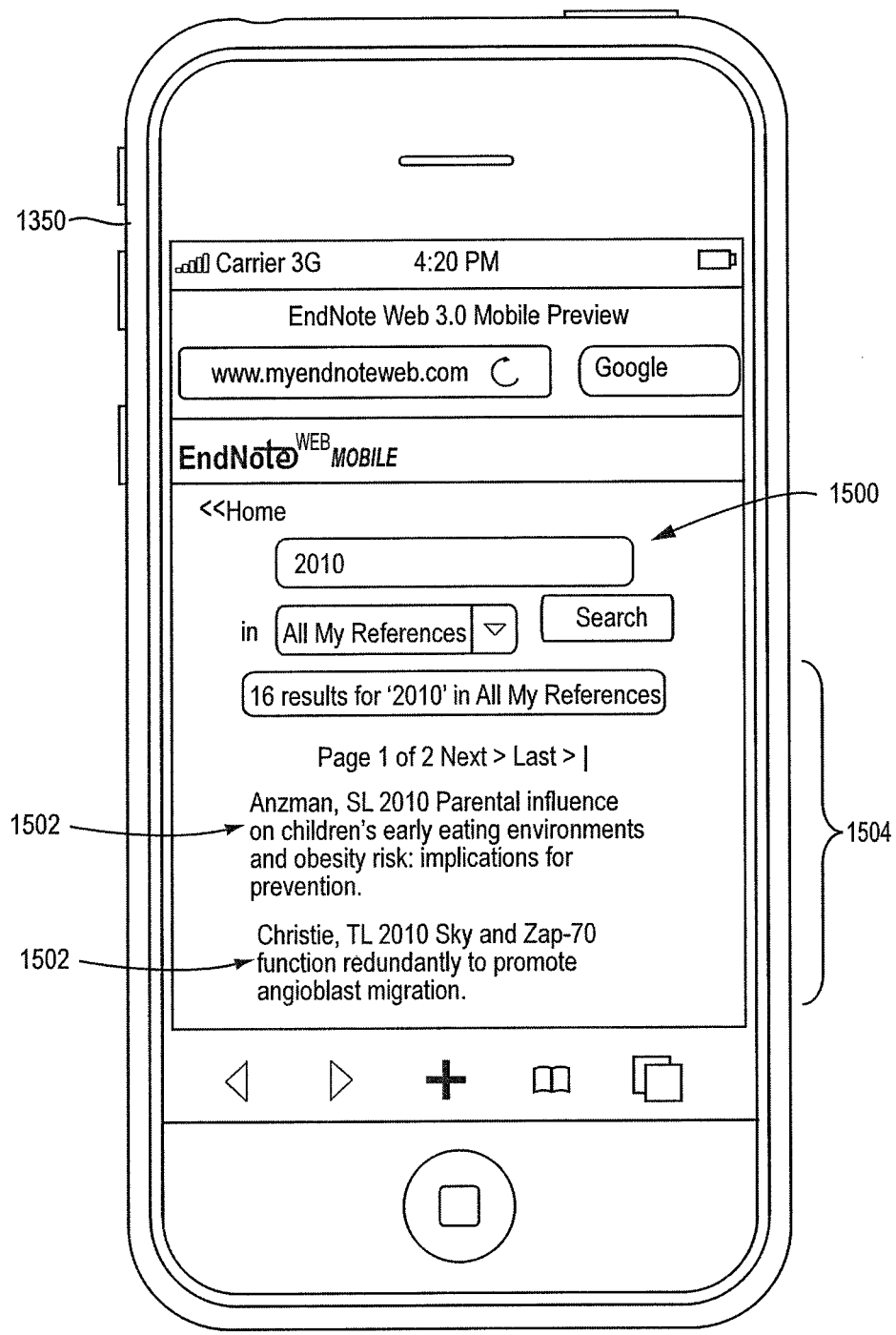
FIG. 15 depicts an exemplary graphical user interface that can be rendered on a display of the portable computing device to retrieve and store citation reference data in accordance with exemplary embodiments of the present disclosure.

FIG. 15 depicts an exemplary graphical user interface 1500 that can be rendered on a display of the portable computing device 1350 (e.g., a smartphone, tablet) and that may be used in conjunction with exemplary embodiments of the present disclosure to retrieve and store bibliographic information and/or full-text versions of written works (collectively reference data 1502) in a user's personal reference library 1504. For example, in an exemplary embodiment, the interface 1500 can allow the user of the portable computing device 1350 to interact with EndNote Web®, to store cited reference data including metadata in the portable computing device 1350 and/or remote from the portable computing device 1350 for later retrieval, email and/or printing. In exemplary embodiments, results from search requests submitted by the user through, for example, the portable computing device based on an acquired image of a unique alphanumeric identifier included in a physical/tangible written work, can be stored in the user's personal library 1504 for subsequent use.

Figure 16:
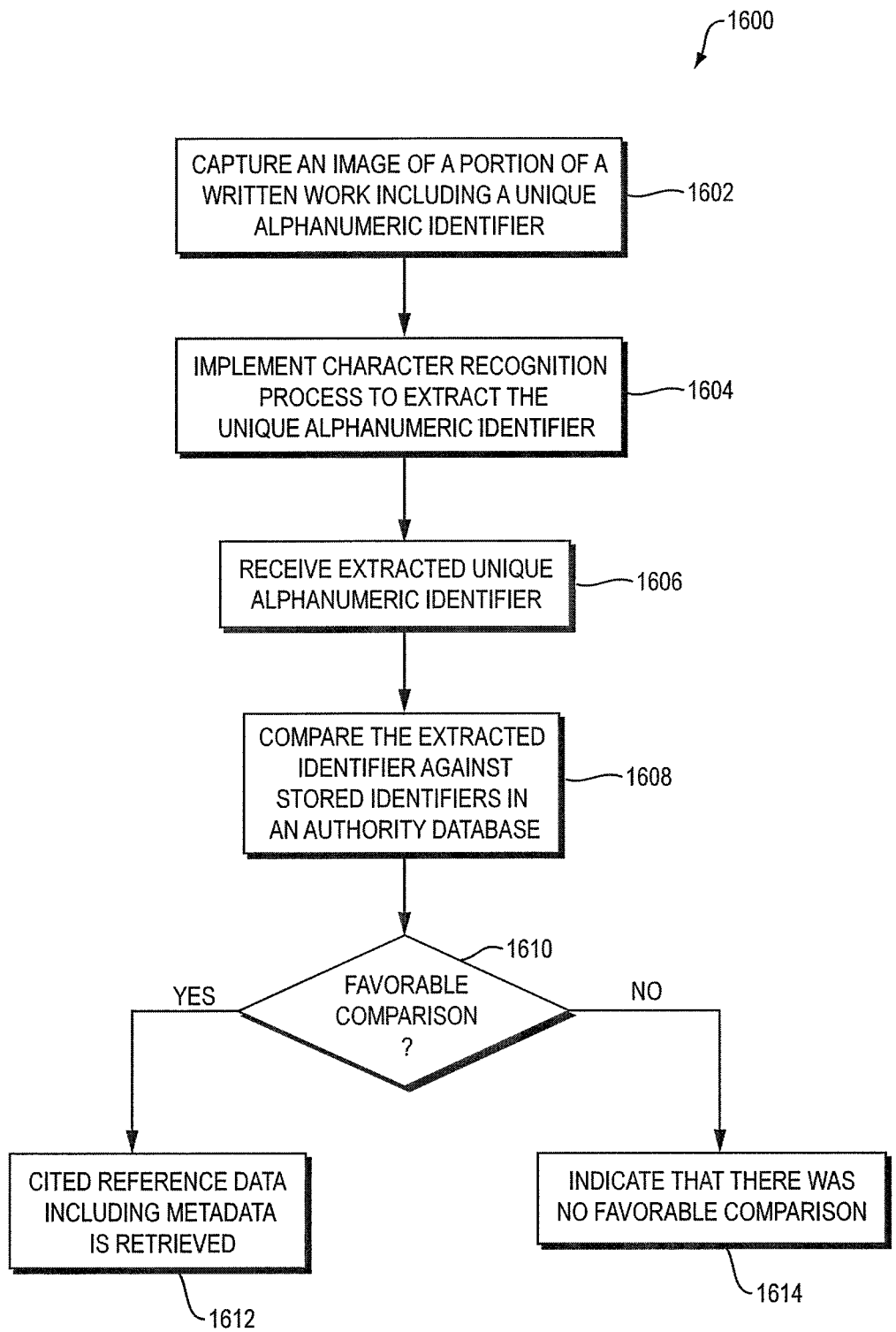
FIG. 16 is a flowchart illustrating an exemplary image-based reference retrieval process that can be implemented in accordance with exemplary embodiments of the present disclosure.

FIG. 16 is a flowchart illustrating an exemplary image-based reference retrieval process 1600 that can be implemented in accordance with exemplary embodiments of the present disclosure. To being, at step 1602, a user's portable computing device can be utilized to capture an image of a portion of a written work including a unique alphanumeric identifier. At step 1604, a character recognition process can be implemented on the image to extract the unique alphanumeric identifier. Once the unique alphanumeric identifier is obtained, the identifier is sent to a comprehensive reference management system (e.g., Thomson Reuters' Web of Knowledge research platform) by the portable computing device at step 1606.

At step 1608, the reference management system execute code to programmatically compare the received identifier against stored identifiers in at least one authority database (e.g., Thomson Reuters Web of Knowledge and Web of Science databases and/or public citation reference databases). If there is a favorable comparison (step 1610), cited reference data including metadata is retrieved for the written work associated with the unique alphanumeric identifier extracted from the image at step 1612. (As set forth above, it will be appreciated by those of skill in the art that a "favorable comparison" encompasses not only an exact match of the extracted unique alphanumeric identifier and the stored identifier, but also a less than exact match, where some degree or percentage of tolerance is allowed. In such a case, the reference management system may communicate that an exact match has not been found and may suggest possible alternates.)

If there is no favorable comparison (step 1610), the reference management system can be executed to instruct a user interface to render a GUI on a display of the user's portable computing device indicating that there was no favorable comparison and that the search criteria (e.g., including the unique alphanumeric identifier) can be modified/edited and resubmitted for another comparison at step 1614. In some embodiments, the cited reference data including metadata may be stored off-device; for example, in a component of the comprehensive reference management system (e.g., EndNote® Web) for later retrieval, email and/or printing.

Figure 17:
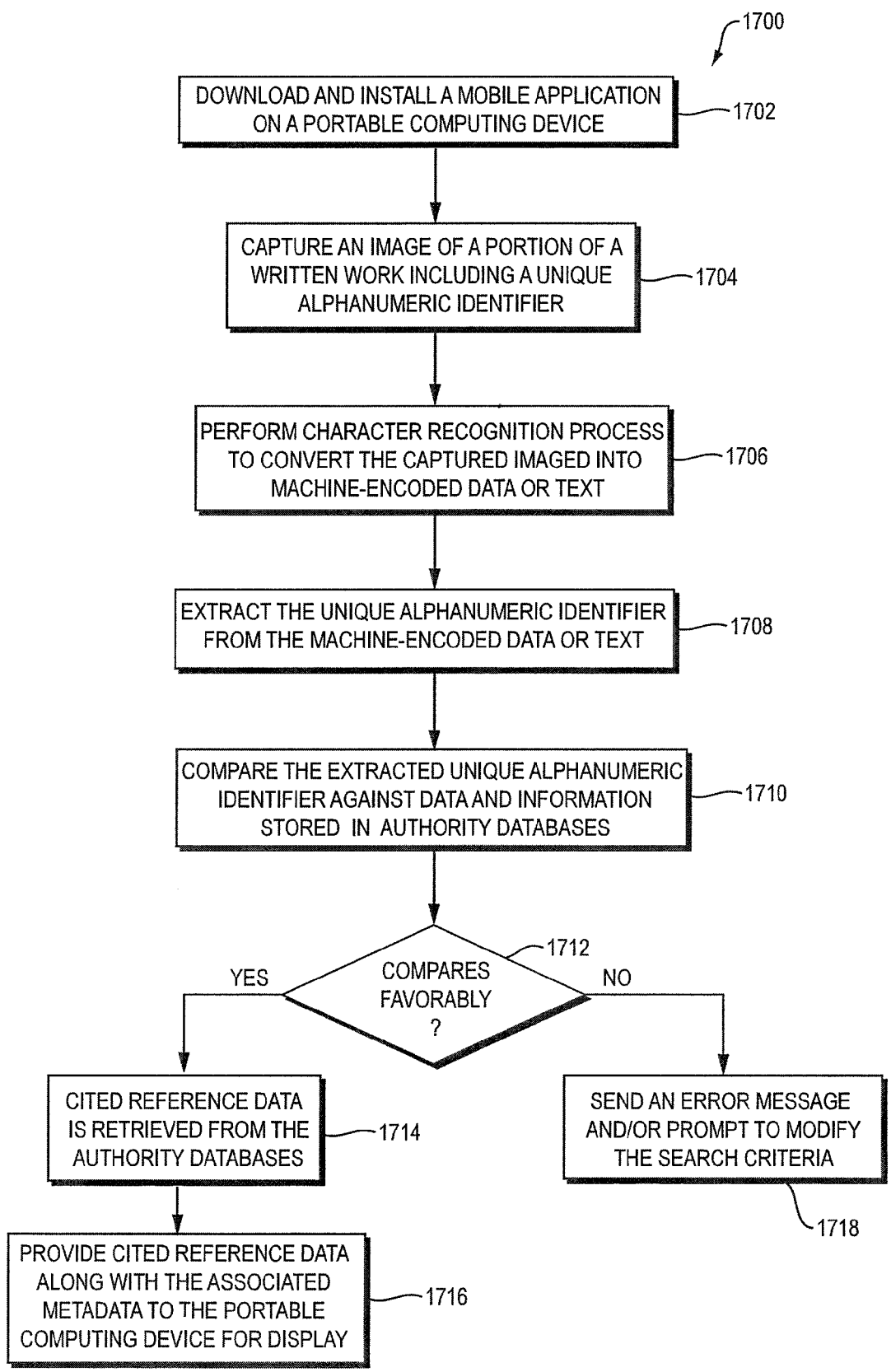
FIG. 17 is flowchart illustrating an exemplary image-based reference retrieval process that can be implemented in accordance with exemplary embodiments of the present disclosure.

FIG. 17 flowchart illustrating an exemplary image-based reference retrieval process 1700 that can be implemented in accordance with exemplary embodiments of the present disclosure. At step 1702, a user's portable computing device can download and install a mobile application (e.g., a client-side application specific to the reference management system). After the application is downloaded the user can create an account with the reference management. These steps are known to those of skill in the art and will not be discussed in further detail. In some embodiments, the communications between the reference management system and the portable computing device are carried out using XML Remote Procedure Call over Secured Socket Layer (XRPC over SSL), and the authorization responses and requests use the open authorization (OAuth) protocol using the portable computing device's mobile station ID (MSID). In one embodiment, authentication and registration subsystems (not shown) of the reference management system (e.g., Thomson Reuters' Web of Knowledge research platform), and a user rights management and authentication system (e.g., Valve Corporation's STEAM solution) register and authenticate the portable computing device.

After mobile application installation and authentication, the user can capture an image of a portion of a written work including a unique alphanumeric identifier using the portable computing device at step 1704. At step 1706, the captured image can be forwarded to a system component that executes a character recognition process to convert the captured imaged into machine-encoded data or text, and at step 1708, the unique alphanumeric identifier is extracted from the machine-encoded data or text.

At step 1710, the extract unique alphanumeric identifier is compared against data and information stored in one or more authority databases. If the extracted identifier compares favorably with the data and information stored in the one or more authority databases (step 1712), the associated cited reference data is retrieved from the authority database(s) at step 1714 and provided along with the associated metadata to the portable computing device for display at step 1716. Otherwise, the user may be sent an error message and/or may be prompted to modify the search criteria at step 1718. The data and information provided by the system may be stored off-device for later use and retrieval by the user. In one embodiment, the data and information is provisioned or customized and stored in a reference library component in Thomson Reuters' EndNote publishing solution.

Various features of the system may be implemented in hardware, software, firmware or a combination thereof. For example, some features of the system may be implemented in one or more computer programs executing on programmable computers.

Each program may be implemented in a high level procedural or object-oriented programming language to communicate with a computer system or other machine.

Furthermore, each such computer program may be stored on a non-transitory storage medium such as read only-memory (ROM) readable or executable by processing device, for configuring and operating the computer to perform the functions described above.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A method of implementing image-based retrieval of a cited reference in a written work comprising:
   programmatically comparing, by a computer system, a unique alphanumeric identifier extracted from an image taken of a portion of a written work to stored identifiers in a plurality of authority databases in response to a request received from a portable computing device having a display, at least one processor, a battery, and an image capture device, the image being captured by the image capture device, the unique alphanumeric identifier corresponding to a single string of alphanumeric characters having a known format;
   controlling an order in which the computing system queries the plurality of authority databases based on a pattern found in the unique identifier;
   executing code to query the plurality of authority databases in the order to retrieve bibliographic information in response to a favorable comparison of the unique alphanumeric identifier to at least one of the stored identifiers associated with a reference stored in one or more of the plurality of authority databases; and
   providing the bibliographic information from the computer system to the portable computing device for output on the display of the portable computing device based on the unique alphanumeric identifier.

2. The method of claim 1, further comprising extracting the unique alphanumeric identifier upon execution of a character recognition process, the character recognition process including at least one of an optical character recognition (OCR) process, an intelligent character recognition (ICR) process, or an intelligent word recognition (IWR) process.

3. The method of claim 1, wherein the unique alphanumeric identifier is a digital object identifier.

4. The method of claim 3, wherein written work is a scholarly reference publication, the image includes text of the scholarly reference publication, the unique alphanumeric identifier includes the single string of alphanumeric characters extracted from the text included in the image.

5. The method of claim 1, further comprising:
extracting the unique alphanumeric identifier upon execution of a character recognition process by the portable computing device; and
parsing alphanumeric characters extracted from the image to obtain the unique alphanumeric identifier.

6. The method of claim 1, further comprising:
extracting the unique alphanumeric identifier upon execution of a character recognition process by the computer system; and
parsing alphanumeric characters extracted from the image to obtain the unique alphanumeric identifier.

7. The method of claim 1, further comprising:
extracting the unique alphanumeric identifier upon execution of a character recognition process by a second computer system; and
parsing alphanumeric characters extracted from the image to obtain the unique alphanumeric identifier.

8. The method of claim 1, further comprising:
receiving at the computer system, a further request from the portable computing device in response to an unfavorable comparison between the unique alphanumeric identifier and the stored identifiers in the plurality of authority databases, the further request including modified search criteria; and
searching at least one of the plurality of authority databases based on the modified search criteria.

9. The method of claim 1, further comprising:
applying an authorization process in order to determine an authorization level of a user of the portable computing device; and,
providing a first subset of the bibliographic information from the computer system based on a first level of authorization of the user and a second subset of the bibliographic information based on a second level of authorization of the user.

10. The method of claim 9, wherein the first and second authorization levels are based on a subscription service level.

11. The method of claim 1, further comprising:
applying an authorization process in order to determine whether a user of the portable computing device is an authorized user; and
optimizing the bibliographic information for display on a portable computing device if the user of the portable computing device is authorized.

12. The method of claim 11, wherein the user is authenticated based on a subscription status.

13. The method of claim 1, wherein the cited reference data comprises at least one of title, author, and publication year.

14. The method of claim 1, further comprising receiving from the portable computing device the cited reference data for storage in a reference management system.

15. The method of claim 14, wherein the reference management system is integrated with the computer system.

16. The method of claim 14, wherein the reference management system includes a web-based user interface.

17. A computer system for implementing image-based retrieval of a cited reference in a written work comprising:
one or more servers, the one or more servers including at least one processing device and at least one non-transitory computer-readable medium storing instruction being executed by the at least one processing device to:
programmatically compare a unique alphanumeric identifier extracted from an image taken of a portion of a written work to stored identifiers in a plurality of authority databases in response to a request received from a portable computing device having a display, at least one processor, a battery, and an image capture device, the image being captured by the image capture device, the unique alphanumeric identifier corresponding to a single string of alphanumeric characters having a known format;
control an order in which the computing system queries the plurality of authority databases based on a pattern found in the unique identifier;
query the plurality of authority databases in the order to retrieve bibliographic information in response to a favorable comparison of the unique alphanumeric identifier to at least one of the stored identifiers associated with a reference stored in one or more of the plurality of authority databases; and
provide the bibliographic information from the one or more computing devices to the portable computing device for output on the display of the portable computing device based on the unique alphanumeric identifier.

18. The system of claim 17, wherein execution of the instructions by the at least one processing device causes the at least one processing to:
extract the unique alphanumeric identifier upon execution of a character recognition process by the computer system; and
parse alphanumeric characters extracted from the image to obtain the unique alphanumeric identifier.

19. A non-transitory computer-readable medium storing executable instructions that when executed by a processing device cause the processing device to implement a method comprising:
programmatically comparing, by a computer system, a unique alphanumeric identifier extracted from an image taken of a portion of a written work to stored identifiers in a plurality of authority databases in response to a request received from a portable computing device having a display, at least one processor, a battery, and an image capture device, the image being captured by the image capture device, the unique alphanumeric identifier corresponding to a single string of alphanumeric characters having a known format;
controlling an order in which the computing system queries the plurality of authority databases based on a pattern found in the unique identifier;
executing code to query the plurality of authority databases in the order to retrieve bibliographic information in response to a favorable comparison of the unique alphanumeric identifier to at least one of the stored identifiers associated with a reference stored in one or more of the plurality of authority databases; and
providing the bibliographic information from the computer system to the portable computing device for output on the display of the portable computing device based on the unique alphanumeric identifier.

* * * * *

UNITED STATES PATENT AND TRADEMARK OFFICE
CERTIFICATE OF CORRECTION

PATENT NO. : 9,690,807 B2
APPLICATION NO. : 14/132696
DATED : June 27, 2017
INVENTOR(S) : Jason E. Rollins Page 1 of 1

It is certified that error appears in the above-identified patent and that said Letters Patent is hereby corrected as shown below:

On the Title Page

(71) Applicant:
Remove: Thomson ReuterS Global Resources, Baar (CH)
Insert: --Thomson Reuters Global Resources, Baar (CH)--

(73) Assignee:
Remove: Thomson Reuter's Global Resources, Baar (CH)
Insert: --Thomson Reuters Global Resources, Baar (CH)--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*